US012597544B2

(12) United States Patent
Morton

(10) Patent No.: US 12,597,544 B2
(45) **Date of Patent: *Apr. 7, 2026**

(54) MAGNETIC COUPLING DEVICE

(71) Applicant: Magswitch Automation Company, Superior, CO (US)

(72) Inventor: David H. Morton, Boulder, CO (US)

(73) Assignee: Magswitch Automation Company, Superior, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/245,105

(22) Filed: Jun. 20, 2025

(65) Prior Publication Data

US 2025/0316412 A1 Oct. 9, 2025

Related U.S. Application Data

(60) Division of application No. 18/823,658, filed on Sep. 3, 2024, now Pat. No. 12,412,689, which is a continuation of application No. 18/288,140, filed as application No. PCT/US2022/031286 on May 27, 2022, now Pat. No. 12,112,889.

(60) Provisional application No. 63/194,692, filed on May 28, 2021.

(51) Int. Cl.
*H01F 7/02* (2006.01)

(52) U.S. Cl.
CPC .................................. *H01F 7/0252* (2013.01)

(58) Field of Classification Search
CPC ......... H01F 7/0252; H01F 7/04; B23Q 3/154; B23Q 3/1546; B25J 15/0608; B66C 1/04
See application file for complete search history.

(56) References Cited

U.S. PATENT DOCUMENTS

| | | | |
|---|---|---|---|
| 3,017,545 A | 1/1962 | Meier |
| 4,401,960 A | 8/1983 | Uchikune et al. |
| 6,331,810 B1 | 12/2001 | Jung |
| 6,636,153 B1 | 10/2003 | Barton et al. |
| 7,012,495 B2 | 3/2006 | Underwood et al. |
| 7,049,919 B2 | 5/2006 | Yamaki |
| 7,161,451 B2 | 1/2007 | Shen |
| 8,031,038 B2 | 10/2011 | Kimura |
| 8,183,965 B2 | 5/2012 | Michael |

(Continued)

FOREIGN PATENT DOCUMENTS

| | | |
|---|---|---|
| CN | 201882760 U | 6/2011 |
| CN | 104209892 A | 12/2014 |

(Continued)

OTHER PUBLICATIONS

Gupta et al.; Simulation and Prototyping of Saturable Magnetic Switch for Current Pulse Compression; 2019 IEEE 4th International Conference on Condition Assessment Techniques in Electrical Systems (CATCON); IEEE; 2019.

(Continued)

*Primary Examiner* — Mohamad A Musleh
(74) *Attorney, Agent, or Firm* — Faegre Drinker Biddle & Reath LLP

(57) ABSTRACT

Magnetic coupling devices are disclosed. The magnetic coupling devices may include sensors, retractable pins, stationary pins, probes, and/or additional tools. The magnetic coupling devices may include multiple sets of pole portions, a first set may be received in an opening in a first magnet of the magnetic coupling device and a second set may be outside of an envelope of the first magnet.

4 Claims, 20 Drawing Sheets

(56) References Cited

U.S. PATENT DOCUMENTS

| | | | |
|---|---|---|---|
| 8,256,098 | B2 | 9/2012 | Michael |
| 8,350,663 | B1 | 1/2013 | Michael |
| 8,604,900 | B2 | 12/2013 | Kocijan |
| 8,641,105 | B2 | 2/2014 | Goodman et al. |
| 8,878,639 | B2 | 11/2014 | Kocijan |
| 9,514,904 | B2 | 12/2016 | Dai et al. |
| 10,903,030 | B2 | 1/2021 | Morton et al. |
| 10,971,292 | B2 | 4/2021 | Arnold et al. |
| 11,097,401 | B2 | 8/2021 | Morton et al. |
| 2007/0013468 | A1 | 1/2007 | Heard |
| 2009/0027149 | A1 | 1/2009 | Kocijan |
| 2011/0037547 | A1 | 2/2011 | Cardone et al. |
| 2013/0320686 | A1 | 12/2013 | Morton |
| 2016/0289046 | A1 | 10/2016 | Norton et al. |
| 2017/0103839 | A1 | 4/2017 | Choi |
| 2018/0311795 | A1 | 11/2018 | Morton et al. |
| 2018/0315563 | A1 | 11/2018 | Morton et al. |
| 2021/0031317 | A1 | 2/2021 | Morton et al. |
| 2021/0122011 | A1 | 4/2021 | Kitaura et al. |
| 2024/0428971 | A1 | 12/2024 | Morton |

FOREIGN PATENT DOCUMENTS

| | | | |
|---|---|---|---|
| EP | 2476509 | A1 | 7/2012 |
| GB | 0531946 | A | 1/1941 |
| GB | 2211356 | A | 6/1989 |
| WO | 2009/000008 | A1 | 12/2008 |
| WO | 2015/071878 | A1 | 5/2015 |

OTHER PUBLICATIONS

Kim et al.; Design and Analysis Method for a DC Magnetic Contactor with a Permanent Magnet; 2014 17th International Conference on Electrical Machines and Systems (ICEMS); IEEE; 2014.

Sanati et al.; Optimization of Geometry and Dimensions of Magnetic Switch Core with Approach of Flux Density Uniformity; 2019 International Power System Conference (PSC); IEEE; Oct. 2019.

MAGNETIC COUPLING DEVICE

RELATED APPLICATION

This application is a divisional application of U.S. patent application Ser. No. 18/823,658, filed Sep. 3, 2024, which is a continuation application of U.S. patent application Ser. No. 18/288,140 (now U.S. Pat. No. 12,112,889), filed Oct. 24, 2023 which is a national stage application of PCT International Application No. PCT/US2022/031286, filed May 27, 2022, titled MAGNETIC COUPLING DEVICE, which claims the benefit of U.S. Provisional Application No. 63/194,692, filed May 28, 2021, titled MAGNETIC COUPLING DEVICE, the entire disclosures of which are hereby expressly incorporated by reference herein in their entirety.

TECHNICAL FIELD

The present disclosure is related to magnetic coupling devices and in particular to magnetic coupling devices having multiple workpiece contact interfaces for each pole of the magnetic coupling device.

BACKGROUND

Magnetic coupling devices are known. Exemplary coupling devices are disclosed in U.S. Pat. Nos. 7,012,495, 8,878,639, and US Published Patent Application No. 20180311795.

SUMMARY

In an exemplary embodiment of the present disclosure, a magnetic coupling device for magnetically coupling to a ferromagnetic workpiece is provided. The magnetic coupling device comprising a housing; a switchable magnetic flux source supported by the housing, the switchable magnetic flux source being switchable between at least an OFF state and an ON state; and a plurality of pole portions, each having at least one workpiece engagement surface, the switchable magnetic flux source being positioned between the plurality of pole portions. The plurality of pole portions including a first north pole portion having a first workpiece engagement surface, a second north pole portion having a second workpiece engagement surface, a first south pole portion having a third workpiece engagement surface, and a second south pole portion having a fourth workpiece engagement surface, wherein the second north pole portion and the second south pole portion are each positioned between the first north pole portion and the first south pole portion and the switchable magnetic flux source in an ON state is magnetically coupled to each of the first workpiece engagement surface of the first north pole portion, the second workpiece engagement surface of the second north pole portion, the third workpiece engagement surface of the first south pole portion, and the fourth workpiece engagement surface of the second south pole portion.

In an example thereof, a channel is located between the first north pole portion and the first south pole portion. In a variation thereof, the magnetic coupling device further comprises a sensor positioned in the channel. In another variation thereof, the magnetic coupling device further comprises a tool positioned in the channel. In a further variation thereof, the magnetic coupling device further comprises one of a tool and a sensor positioned in the channel.

In another example variation thereof, the channel extends from a first position above a top side of the switchable magnetic flux source to a second position below the top side of the switchable magnetic flux source.

In a further example thereof, the channel is positioned between the second north pole portion and the second south pole portion.

In yet another example thereof, the second north pole portion is positioned between the second south pole portion and the first north pole portion.

In still another example thereof, the switchable magnetic flux source includes a plurality of permanent magnets. In a variation thereof, at least first one of the plurality of permanent magnets is an electro-permanent magnet. In another variation thereof, at least a second one of the plurality of permanent magnets is a rare earth magnet. In yet another variation thereof, the plurality of permanent magnets including a first permanent magnet and a second permanent magnet movable relative to the first permanent magnet. In a further variation thereof, the second permanent magnet is rotatable relative to the first permanent magnet. In still another variation thereof, each of the first permanent magnet and the second permanent magnet are positioned between the first north pole portion and the first south pole portion. In yet another variation thereof, in the ON state of the magnetic flux source a north pole of the second permanent magnet is generally aligned with a north pole of the first permanent magnet and in the OFF state of the magnetic flux source a south pole of the second permanent magnet is generally aligned with the north pole of the first permanent magnet.

In another exemplary embodiment of the present disclosure, a magnetic coupling device for magnetically coupling to a ferromagnetic workpiece is provided. The magnetic coupling device comprising: a housing; a switchable magnetic flux source supported by the housing including a plurality of permanent magnets, the plurality of permanent magnets including a first permanent magnet and a second permanent magnet movable relative to the first permanent magnet about a first axis of rotation; and a plurality of workpiece engagement surfaces supported by the housing and magnetically coupled to the switchable magnetic flux source, the plurality of workpiece engagement surfaces adapted to contact the ferromagnetic workpiece, a first workpiece engagement surface of the plurality of workpiece engagement surfaces corresponding to a north pole of the magnetic coupling device and a second workpiece engagement surface of the plurality of workpiece engagement surfaces corresponding to a south pole of the magnetic coupling device, both the first workpiece engagement surface and the second workpiece engagement surface being closer to the first axis of rotation than the second permanent magnet.

In an example thereof, the plurality of workpiece engagement surfaces further includes a third workpiece engagement surface corresponding to the north pole of the magnetic coupling device and a fourth workpiece engagement surface corresponding to the south pole of the magnetic coupling device, each of the third workpiece engagement surface and the fourth workpiece engagement surface being further away from the first axis of rotation than the second permanent magnet.

In another example thereof, the first permanent magnet surrounds the first workpiece engagement surface and the second workpiece engagement surface.

In yet another example thereof, each of the first permanent magnet and the second permanent magnet surrounds the first workpiece engagement surface and the second workpiece engagement surface.

In a further example thereof, the magnetic coupling device further comprising: a first pole member including the first workpiece engagement surface; a second pole member including the second workpiece engagement surface, the first pole member and the second pole member defining a channel; and at least one sensor positioned in the channel. In a variation thereof, the second permanent magnet includes a top face and a bottom face, the bottom face facing the first permanent magnet, the at least one sensor is positioned lower than the top face of the second permanent magnet. In another variation thereof, the at least one sensor is positioned lower than the bottom face of the second permanent magnet. In a further variation thereof, the at least one sensor includes a first magnetic field sensor positioned to monitor a first magnetic flux associated with at least one of the first workpiece engagement surface and the second workpiece engagement surface. In yet another variation thereof, the magnetic coupling device further comprising a logic control circuit operatively coupled to the at least one sensor, the logic control circuit configured to determine at least one operating state of the magnetic coupling device based on an output from the at least one sensor. In a further variation thereof, the magnetic coupling device further comprises an output device which provides an indication of the operating state of the magnetic coupling device.

In yet a further example thereof, the magnetic coupling device further comprises at least one of a stationary pin, a retractable pin, and a probe moveable within the channel. In a variation thereof, wherein the probe supports the at least one sensor.

In still yet a further example thereof, the magnetic coupling device further comprises an actuator operatively coupled to the second permanent magnet to move the second permanent magnet relative to the first permanent magnet. In a variation thereof, the actuator is one of a user input having an operator actuatable portion, an electric motor, at least one conductive coil, a hydraulic system, and a pneumatic system. In a further variation thereof, the actuator is a user input having an operator actuatable portion which is moveable between a first position corresponding to the second permanent magnet being in a first orientation relative to the first permanent magnet and a second position corresponding to the second permanent magnet being in a second orientation relative to the first permanent magnet and further comprising a lock to hold the second permanent magnet in at least one of the first orientation and the second orientation.

In a further exemplary embodiment of the present disclosure, a magnetic coupling device for magnetically coupling to a ferromagnetic workpiece is provided. The magnetic coupling device comprising: a housing; a switchable magnetic flux source supported by the housing including a plurality of permanent magnets, the plurality of permanent magnets including a first permanent magnet and a second permanent magnet movable relative to the first permanent magnet about a first axis of rotation; a plurality of workpiece engagement surfaces supported by the housing and magnetically coupled to the switchable magnetic flux source, the plurality of workpiece engagement surfaces adapted to contact the ferromagnetic workpiece, a first workpiece engagement surface of the plurality of workpiece engagement surfaces corresponding to a north pole of the magnetic coupling device and a second workpiece engagement surface of the plurality of workpiece engagement surfaces corresponding to a south pole of the magnetic coupling device; and at least one sensor positioned in a channel between the first workpiece engagement surface and the second workpiece engagement surface and between a lower surface of the first permanent magnet and the upper surface of the second permanent magnet.

In yet a further exemplary embodiment of the present disclosure, a magnetic coupling device for magnetically coupling to a ferromagnetic workpiece is provided. The magnetic coupling device comprising: a housing; a switchable magnetic flux source supported by the housing including a plurality of permanent magnets, the plurality of permanent magnets including a first permanent magnet and a second permanent magnet movable relative to the first permanent magnet about a first axis of rotation; a plurality of workpiece engagement surfaces supported by the housing and magnetically coupled to the switchable magnetic flux source, the plurality of workpiece engagement surfaces adapted to contact the ferromagnetic workpiece, a first workpiece engagement surface of the plurality of workpiece engagement surfaces corresponding to a north pole of the magnetic coupling device and a second workpiece engagement surface of the plurality of workpiece engagement surfaces corresponding to a south pole of the magnetic coupling device; and at least one tool positioned in a channel between the first workpiece engagement surface and the second workpiece engagement surface and between a lower surface of the first permanent magnet and the upper surface of the second permanent magnet.

In still a further exemplary embodiment of the present disclosure, a magnetic coupling device for magnetically coupling to a ferromagnetic workpiece is provided. The magnetic coupling device comprising: a housing; a switchable magnetic flux source supported by the housing including a plurality of permanent magnets, the plurality of permanent magnets including a first permanent magnet and a second permanent magnet movable relative to the first permanent magnet, the first permanent magnet having a first end surface and a second end surface; a plurality of workpiece engagement surfaces supported by the housing and magnetically coupled to the switchable magnetic flux source, the plurality of workpiece engagement surfaces adapted to contact the ferromagnetic workpiece. The plurality of workpiece engagement surfaces comprising: a first workpiece engagement surface positioned adjacent the first end surface of the first permanent magnet, a second workpiece engagement surface positioned adjacent the second end surface of the first permanent magnet, each of the first workpiece engagement surface and the second workpiece engagement surface corresponding to a north pole of the magnetic coupling device; a third workpiece engagement surface; and a fourth workpiece engagement surface spaced apart from the third workpiece engagement surface, each of the third workpiece engagement surface and the fourth workpiece engagement surface corresponding to a south pole of the magnetic coupling device.

In an example thereof, the third workpiece engagement surface is positioned adjacent the first end surface of the first permanent magnet and the fourth workpiece engagement surface is positioned adjacent the second end surface of the first permanent magnet.

In another example thereof, the second permanent magnet is rotatable relative to the first permanent magnet. In a variation thereof, a strength level of a magnetic field of the north pole of the magnetic coupling device is varied based on a rotational position of the second permanent magnet relative to the first permanent magnet. In a further variation thereof, the strength level of the magnetic field of the north pole of the magnetic coupling device is strongest when a north pole of the second permanent magnet is aligned with a north pole of the first permanent magnet and is weakest when the north pole of the second permanent magnet is aligned with a south pole of the first permanent magnet.

In a further example thereof, the first permanent magnet surrounds the first workpiece engagement surface and the third workpiece engagement surface.

In yet another example thereof, each of the first permanent magnet and the second permanent magnet surrounds the first workpiece engagement surface and the third workpiece engagement surface.

In still another example thereof, the magnetic coupling device further comprises a first pole member including the first workpiece engagement surface; a second pole member including the third workpiece engagement surface, the first pole member and the second pole member defining a channel; and at least one sensor positioned in the channel. In a variation thereof, the second permanent magnet includes a top face and a bottom face, the bottom face facing the first permanent magnet, the at least one sensor is positioned lower than the top face of the second permanent magnet In another variation thereof, the at least one sensor is positioned lower than the bottom face of the second permanent magnet. In still another variation thereof, the at least one sensor includes a first magnetic field sensor positioned to monitor a first magnetic flux associated with at least one of the first workpiece engagement surface and the third workpiece engagement surface. In a further variation thereof, the magnetic coupling device further comprises a logic control circuit operatively coupled to the at least one sensor, the logic control circuit configured to determine at least one operating state of the magnetic coupling device based on an output from the at least one sensor. In yet a further variation thereof, the magnetic coupling device further comprises an output device which provides an indication of the operating state of the magnetic coupling device. In still another variation thereof, the magnetic coupling device further comprises a probe moveable within the channel. In a further still variation thereof, the probe supports the at least one sensor.

In a further still example thereof, the magnetic coupling device further comprises an actuator operatively coupled to the second permanent magnet to move the second permanent magnet relative to the first permanent magnet. In a variation thereof, the actuator is one of a user input having an operator actuatable portion, an electric motor, at least one conductive coil, a hydraulic system, and a pneumatic system.

In still another exemplary embodiment of the present disclosure, a magnetic coupling device for magnetically coupling to a ferromagnetic workpiece is provided. The magnetic coupling device comprising: a housing; a switchable magnetic flux source supported by the housing including at least one electro-permanent magnet; and a plurality of workpiece engagement surfaces supported by the housing and magnetically coupled to the switchable magnetic flux source. The plurality of workpiece engagement surfaces adapted to contact the ferromagnetic workpiece, a first pole portion including a first workpiece engagement surface of the plurality of workpiece engagement surfaces, a second pole portion including a second workpiece engagement surface of the plurality of workpiece engagement surfaces, the first workpiece engagement surface and the second workpiece engagement surface corresponding to a north pole of the magnetic coupling device, a third pole portion including a third workpiece engagement surface of the plurality of workpiece engagement surfaces, and a fourth pole portion including a fourth workpiece engagement surface of the plurality of workpiece engagement surfaces, the third workpiece engagement surface and the fourth workpiece engagement surface corresponding to a south pole of the magnetic coupling device, both the first pole portion and the third pole portion being received in an opening in the switchable magnetic flux source.

In an example thereof, the second pole portion and the fourth pole portion are outside of an envelope of the switchable magnetic flux source.

In another example thereof, the switchable magnetic flux source includes at least one rare earth permanent magnet.

In a further example thereof, the magnetic coupling device further comprises at least one sensor, wherein the first pole member and the second pole member define a channel, the at least one sensor positioned in the channel.

In yet a further example thereof, a proximity sensor is positioned in the channel.

In yet still another exemplary embodiment of the present disclosure, a magnetic coupling device for magnetically coupling to a ferromagnetic workpiece is provided. The magnet coupling device comprising: a housing; a switchable magnetic flux source supported by the housing including a plurality of magnets, the plurality of magnets including a first magnet and a second magnet, the switchable magnetic flux having a first configuration wherein a north pole of the second magnet is aligned relative to the first magnet and a second configuration wherein a south pole of the second magnet is aligned relative to the north pole of the first magnet; and a plurality of workpiece engagement surfaces supported by the housing and magnetically coupled to the switchable magnetic flux source. The plurality of workpiece engagement surfaces adapted to contact the ferromagnetic workpiece, a first pole portion including a first workpiece engagement surface of the plurality of workpiece engagement surfaces, a second pole portion including a second workpiece engagement surface of the plurality of workpiece engagement surfaces, the first workpiece engagement surface and the second workpiece engagement surface corresponding to a north pole of the magnetic coupling device, a third pole portion including a third workpiece engagement surface of the plurality of workpiece engagement surfaces, and a fourth pole portion including a fourth workpiece engagement surface of the plurality of workpiece engagement surfaces, the third workpiece engagement surface and the fourth workpiece engagement surface corresponding to a south pole of the magnetic coupling device, both the first pole portion and the third pole portion being received in an opening in the switchable magnetic flux source.

In an example thereof, the second pole portion and the fourth pole portion are outside of an envelope of the first magnet.

In another example thereof, the second magnet is movable relative to the first permanent magnet. In a variation thereof, the second magnet is rotatable relative to the first magnet. In another variation thereof, a strength level of a magnetic field of the north pole of the magnetic coupling device is varied based on a rotational position of the second magnet relative to the first magnet.

In a further example thereof, the strength level of the magnetic field of the north pole of the magnetic coupling device is strongest when a north pole of the second magnet is aligned with a north pole of the first magnet and is weakest when the north pole of the second magnet is aligned with a south pole of the first magnet.

In yet a further example thereof, the magnetic coupling device further comprises at least one sensor, wherein the first pole member and the second pole member define a channel, the at least one sensor positioned in the channel. In a variation thereof, the second magnet includes a top face and a bottom face, the bottom face facing the first magnet, the at least one sensor is positioned lower than the top face of the second magnet. In a further variation thereof, the at least one sensor is positioned lower than the bottom face of the second magnet.

In still a further example thereof, the at least one sensor includes a first magnetic field sensor positioned to monitor a first magnetic flux associated with at least one of the first workpiece engagement surface and the third workpiece engagement surface.

In another still example thereof, the magnetic coupling device further comprises a logic control circuit operatively coupled to the at least one sensor, the logic control circuit configured to determine at least one operating state of the magnetic coupling device based on an output from the at least one sensor. In a variation thereof, the magnetic coupling device further comprises an output device which provides an indication of the operating state of the magnetic coupling device.

In a further still example thereof, the magnetic coupling device further comprises at least one of a pin, a probe, and tool positioned within the channel. In a variation thereof, the probe supports the at least one sensor.

In another yet still example thereof, the magnetic coupling device further comprises an actuator operatively coupled to the second magnet to move the second magnet relative to the first magnet. In a variation thereof, the actuator is one of a user input having an operator actuatable portion, an electric motor, at least one conductive coil, a hydraulic system, and a pneumatic system.

In another example thereof, the first magnet is a permanent magnet.

In yet another example thereof, each of the first magnet and the second magnet is a permanent magnet.

In yet still another exemplary embodiment, a magnetic coupling device for magnetically coupling to a ferromagnetic workpiece is provided. The magnetic coupling device comprising: a housing and a switchable magnetic flux source supported by the housing including a plurality of magnets and a plurality of ferromagnetic inserts. The plurality of magnets including a first permanent ring magnet having a first outer circumferential surface and a first inner circumferential surface and a second permanent ring magnet having a second outer circumferential surface and a second inner circumferential surface. The plurality of ferromagnetic inserts including a first ferromagnetic insert having a first outer arcuate surface positioned adjacent the first inner circumferential surface of the first permanent ring magnet and a second ferromagnetic insert having a second outer arcuate surface positioned adjacent the second inner circumferential surface of the second permanent magnet. The switchable magnetic flux having a first configuration wherein a north pole of the second permanent ring magnet is aligned relative to a north pole of the first permanent ring magnet and a second configuration wherein a south pole of the second permanent ring magnet is aligned relative to the north pole of the first permanent magnet. A plurality of workpiece engagement surfaces magnetically coupled to the switchable magnetic flux source. The plurality of workpiece engagement surfaces adapted to contact the ferromagnetic workpiece. A first pole portion including a first workpiece engagement surface of the plurality of workpiece engagement surfaces. A second pole portion including a second workpiece engagement surface of the plurality of workpiece engagement surfaces.

In an example thereof, the second permanent ring magnet is moveable relative to the first permanent ring magnet. In a variation thereof, the second permanent ring magnet is rotatable relative to the first permanent ring magnet about a first axis. In another variation thereof, the first ferromagnetic insert remains stationary relative to the first permanent ring magnet as the second permanent ring magnet rotates relative to the first permanent ring magnet. In a further variation thereof, the second ferromagnetic insert remains stationary relative to the first permanent ring magnet as the second permanent ring magnet rotates relative to the first permanent ring magnet.

In a further example thereof, each of the first outer arcuate surface of the first ferromagnetic insert and the second outer arcuate surface of the second ferromagnetic insert are positioned closer to the first axis than the first permanent ring magnet and the second permanent ring magnet.

In still a further example thereof, the first outer arcuate surface of the first ferromagnetic insert contacts the first inner circumferential surface of the first permanent ring magnet.

In yet still a further example thereof, the first outer arcuate surface of the first ferromagnetic insert contacts the second inner circumferential surface of the second permanent ring magnet.

Other aspects and optional and/or preferred embodiments will become apparent from the following description provided below with reference to the accompanying drawings.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

DETAILED DESCRIPTION OF THE DRAWINGS

Figure 1:
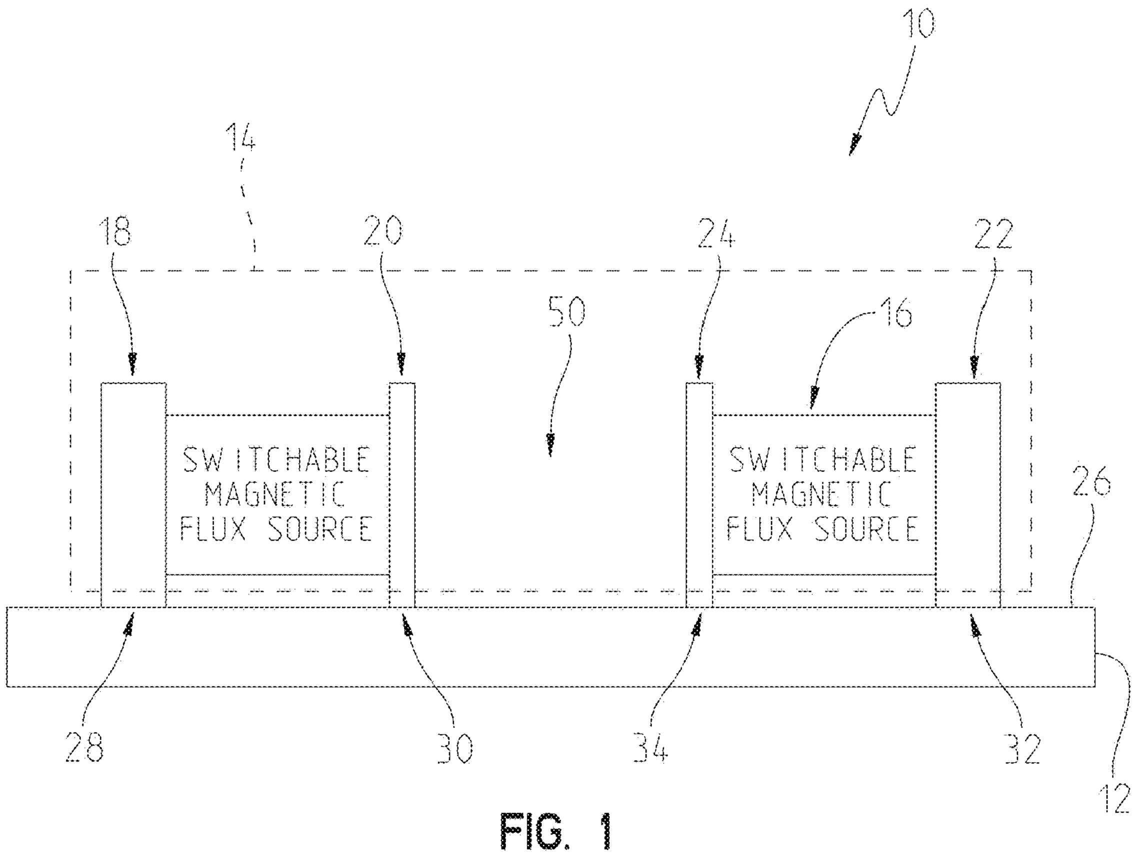
FIG. 1 illustrates a representative view of an exemplary magnetic coupling device having multiple workpiece contact interfaces for each pole of the magnetic coupling device and the magnetic coupling device in an OFF state.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an exemplary magnetic coupling tool 10 is shown. Magnetic coupling device 10 is configured to magnetically couple a ferromagnetic workpiece 12. Magnetic coupling device 10 includes a housing 14, a switchable magnetic flux source 16, a first north pole portion 18, a second north pole portion 20, a first south pole portion 22, and a second south pole portion 24. First north pole portion 18 includes a workpiece interface 28, second north pole portion 20 includes a workpiece interface 30, first south pole portion 22 includes a workpiece interface 32, and second south pole portion 24 includes a workpiece interface 34, each of which contacts a respective part of ferromagnetic workpiece 12, illustratively a surface 26 of ferromagnetic workpiece 12. Each of workpiece interface 28, workpiece interface 30, workpiece interface 32, and workpiece interface 34 include at least one workpiece engagement surface. Workpiece interface 28, workpiece interface 30, workpiece interface 32, and workpiece interface 34 may each be planar, curved, contoured, have a plurality of spaced apart projections, or any other suitable shape for contacting ferromagnetic workpiece 12. Each of first north pole portion 18, second north pole portion 20, first south pole portion 22, and second south pole portion 24 are made of a ferromagnetic material and may be a part of housing 14 or separate components coupled to housing 14.

Figure 2:
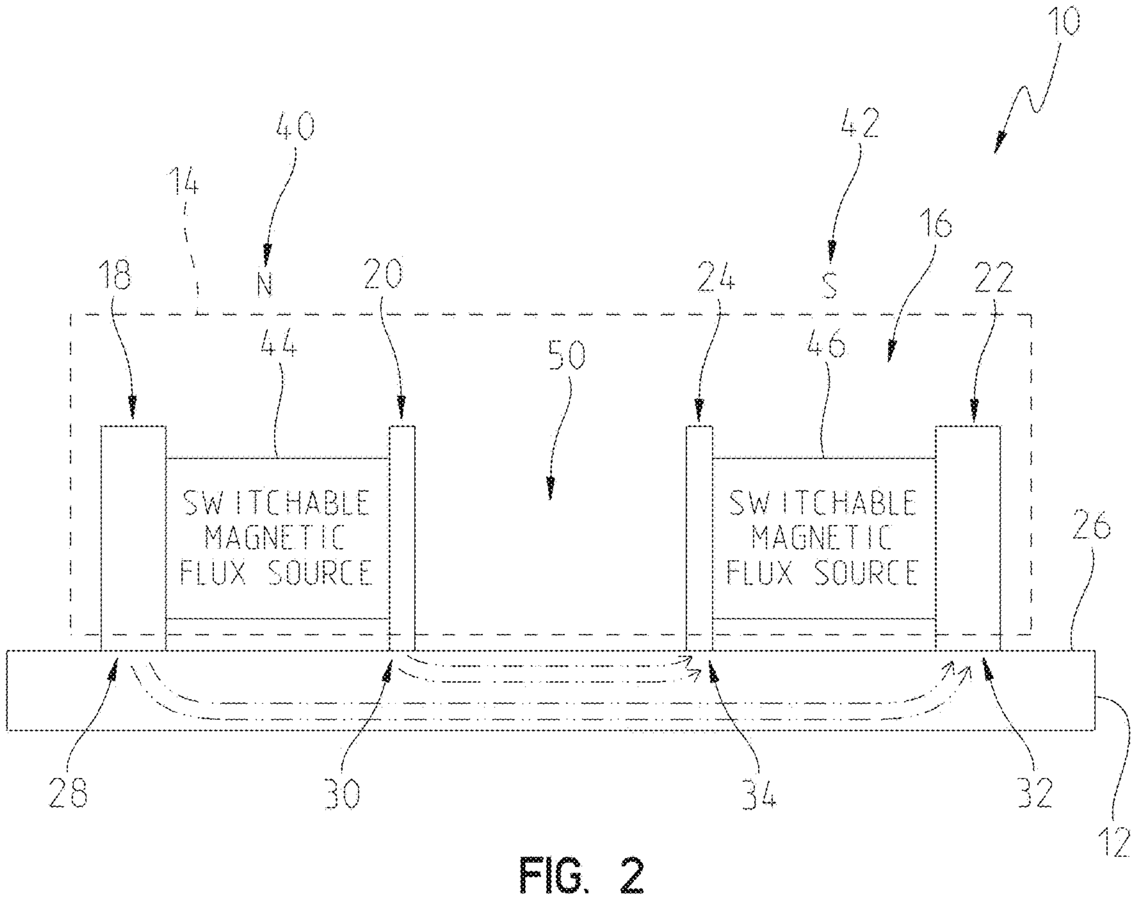
FIG. 2 illustrates the magnetic coupling device of FIG. 1 with the magnetic coupling device in an ON state.

Switchable magnetic flux source 16 of magnetic coupling tool 10 is switchable between an OFF state wherein a magnetic circuit is formed within housing 14 and an ON state wherein a magnetic circuit is formed from switchable magnetic flux source 16 through workpiece interface 28 and workpiece interface 30 of magnetic coupling tool 10, through ferromagnetic workpiece 12, through workpiece interface 32 and workpiece interface 34 of magnetic coupling tool 10, and back to switchable magnetic flux source 16 (as represented by the arrows shown in FIG. 2). In embodiments, switchable magnetic flux source 16 may be placed in at least one partial ON state wherein the strength of the magnetic circuit formed through ferromagnetic workpiece 12 is more than the OFF state and less than the ON state.

Switchable magnetic flux source 16 may include multiple permanent magnets and is configurable to have an overall north pole portion 44 and an overall south pole portion 46. As shown in FIG. 2, overall north pole portion 44 of switchable magnetic flux source 16 is positioned between first north pole portion 18 and second north pole portion 20 and overall south pole portion 46 of switchable magnetic flux source 16 is positioned between first south pole portion 22 and second south pole portion 24. Overall north pole portion 44 of switchable magnetic flux source 16 is magnetically coupled with first north pole portion 18 and second north pole portion 20 resulting in workpiece interface 28 of first north pole portion 18 and workpiece interface 30 of second north pole portion 20 forming an overall north pole 40 of magnetic coupling tool 10. Overall south pole portion 46 is magnetically coupled with first south pole portion 22 and second south pole portion 24 resulting in workpiece interface 32 of first south pole portion 22 and workpiece interface 34 of second south pole portion 24 forming an overall south pole 42 of magnetic coupling tool 10.

Switchable magnetic flux source 16 may include one or more permanent magnets and is configurable to have an overall north pole portion 44 and an overall south pole portion 46. In embodiments, switchable magnetic flux source 16 includes at least one electro-permanent magnet which is switchable between an ON state (having a north pole and a south pole) and an OFF state (not magnetized relative to external objects). Further, the at least one electro-permanent magnet may be configured to have varying magnetic strengths which allow the device to be configured in a partial ON state having a magnetic strength at workpiece interfaces 28, 30, 32, and 34 less than the ON state and greater than an OFF state. In embodiments, switchable magnetic flux source 16 includes at least one rare earth permanent magnet and at least one electro-permanent magnet, the combination of which is switchable between an ON state having a magnetic strength at workpiece interfaces 28, 30, 32, and 34 and an OFF state wherein a magnetic circuit is formed internally to housing 14. Further, the combination may be configured to have varying magnetic strengths which allow the device to be configured in a partial ON state having a magnetic strength at workpiece interfaces 28, 30, 32, and 34 less than the ON state and greater than an OFF state. In embodiments, switchable magnetic flux source 16 includes a plurality of rare earth permanent magnets, the combination of which is switchable between an ON state having a magnetic strength at workpiece interfaces 28, 30, 32, and 34 and an OFF state wherein a magnetic circuit is formed internally to housing 14. Further, the combination may be configured to have varying magnetic strengths which allow the device to be configured in a partial ON state having a magnetic strength at workpiece interfaces 28, 30, 32, and 34 less than the ON state and greater than an OFF state. In embodiments, switchable magnetic flux source 16 includes at least one rare earth permanent magnet which is moveable relative to the housing 14 to thus be switchable between an ON state having a magnetic strength at workpiece interfaces 28, 30, 32, and 34 and an OFF state wherein a magnetic circuit is formed internally to housing 14.

As shown in FIGS. 1 and 2, a channel 50 is provided between pole portions 20 and 24. Channel 50, as discussed herein, may receive one or more sensors, stationary pins, retractable pins, probes, and/or additional tools.

Figure 3:
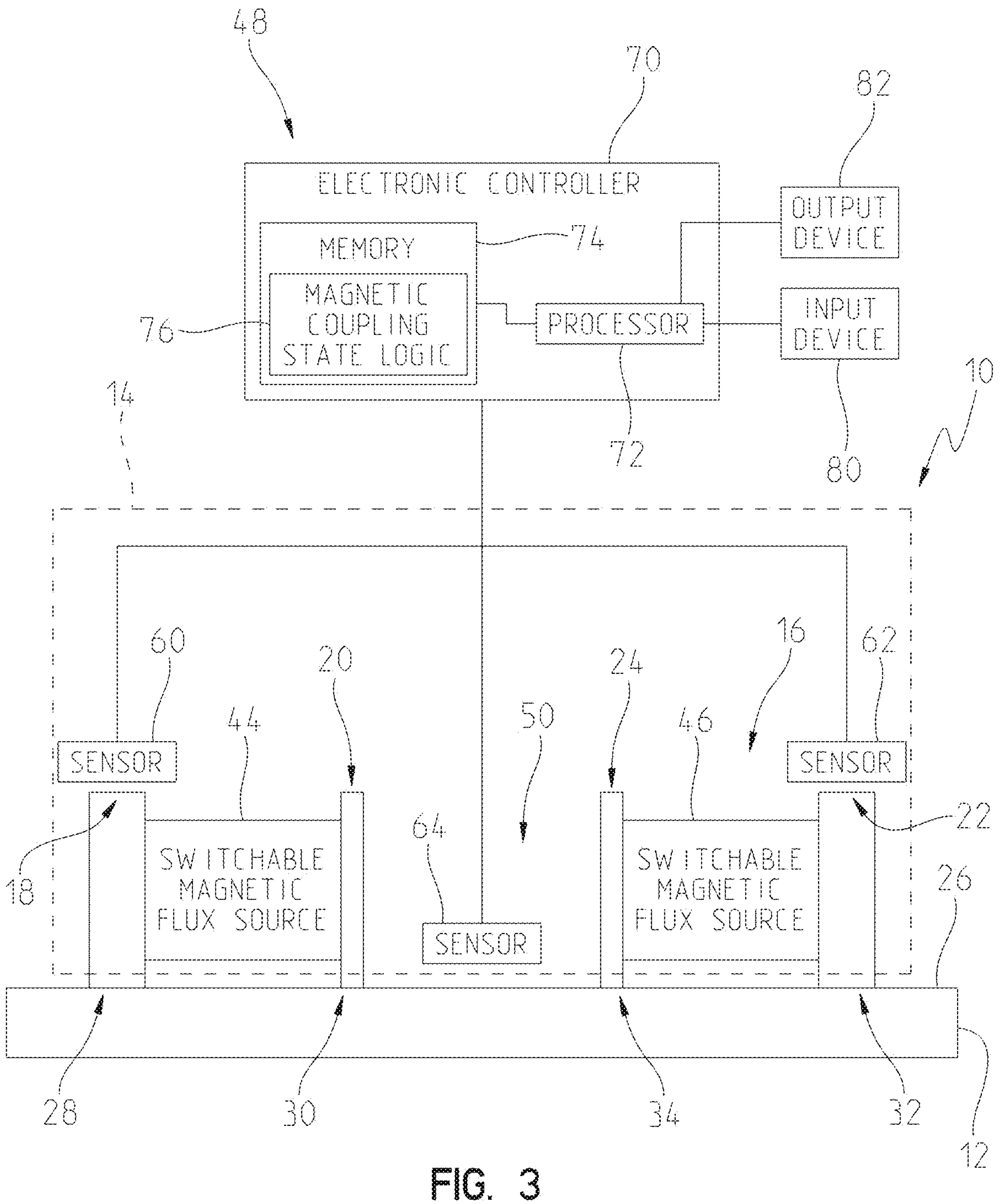
FIG. 3 illustrates the magnetic coupling device of FIG. 1 with a sensing system.

Referring to FIG. 3, in embodiments, magnetic coupling tool 10 further includes a monitoring system 48 including one or more sensors which monitor a characteristic of magnetic coupling tool 10 and/or a characteristic of a magnetic circuit formed between magnetic coupling tool 10 and ferromagnetic workpiece 12. As shown in FIG. 3, a first sensor 60 may be positioned proximate first north pole portion 18, a second sensor 62 may be positioned proximate first south pole portion 22, and a third sensor 64 may be positioned proximate ferromagnetic workpiece 12 in a channel 50 provided between second north pole portion 20 and second south pole portion 24. Each of first sensor 60, second sensor 62, and third sensor 64 may be a magnetic flux sensor. Additional types of sensors include temperature sensors which are used to compensate for temperature dependent drift in the magnetic flux sensors. Additionally, the positions of sensors 60, 62, and 64 are exemplary and one or sensors may be positioned at different locations. In embodiments, sensor 64 may be a proximity sensor. Exemplary proximity sensors include inductive sensors, ultrasound sensors, photonic sensors, and other suitable sensors.

Each of sensors 60, 62, and 64 are operatively coupled to an electronic controller 70. Electronic controller 70 includes at least one processor 72 and associated memory 74. Memory 74 includes magnetic coupling state logic 76, logic control circuit, which monitors the output of sensors 60, 62, 64 to determine one or more characteristics of magnetic coupling tool 10 and/or one or more characteristics of a magnetic circuit formed between magnetic coupling tool 10 and ferromagnetic workpiece 12. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 70 is not microprocessor-based, but rather is configured to control operation of magnetic coupling device 100 based on one or more sets of hardwired instructions. Further, electronic controller 70 may be contained within a single device or be a plurality of devices networked together or otherwise electrically connected to provide the functionality described herein.

Electronic controller 70 may further receive input through one or more input devices 80. Exemplary input devices include buttons, switches, levers, dials, touch displays, soft keys, and a communication module. Electronic controller 70 may further provide output through one or more output devices 82. Exemplary output devices include visual indicators, audio indicators, and a communication module. Exemplary visual indicators include displays, lights, and other visual systems. Exemplary audio indicators include speakers and other suitable audio systems.

Figure 4:
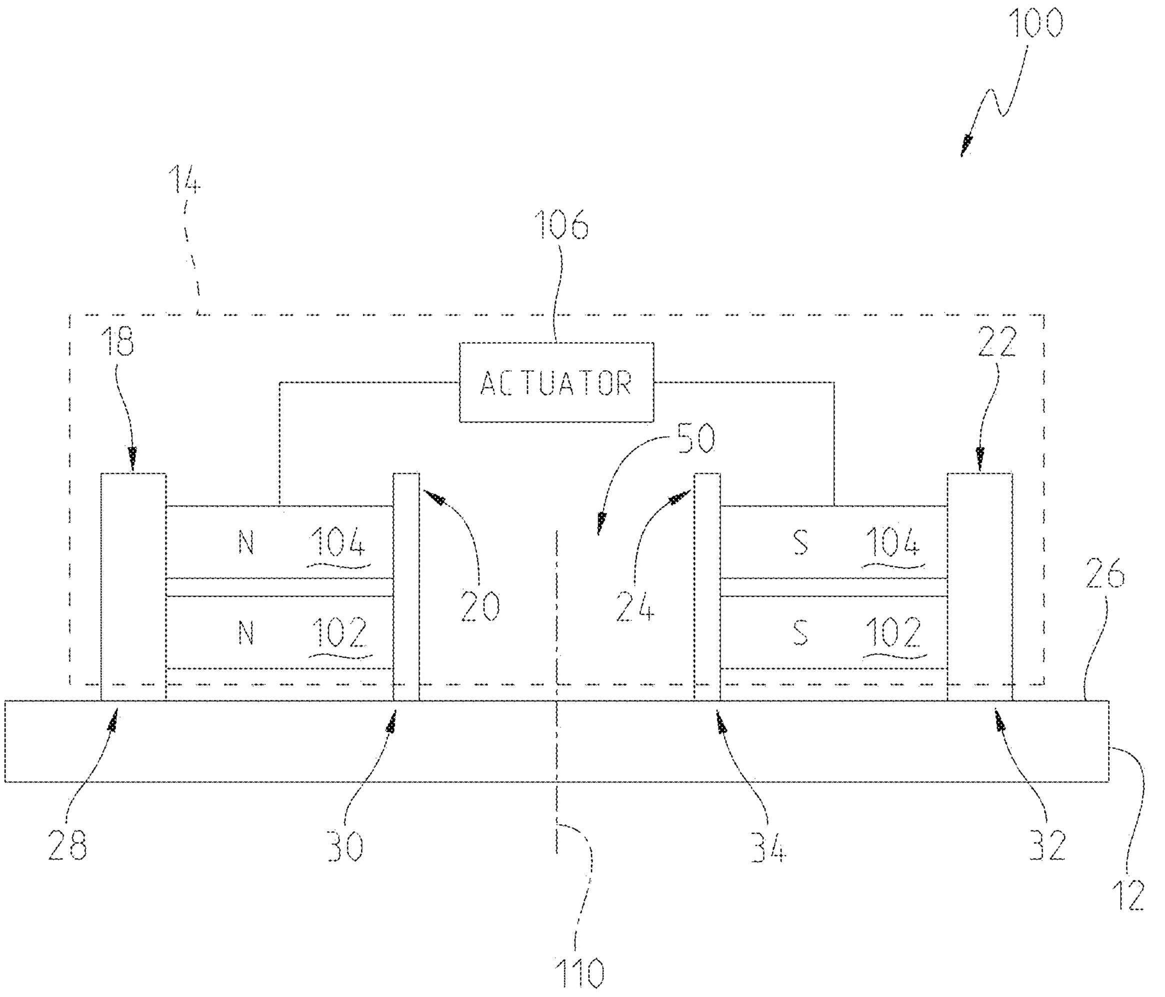
FIG. 4 illustrates a representative view of an exemplary magnetic coupling device having multiple workpiece contact interfaces for each pole of the magnetic coupling device, the magnetic coupling device including a stack of permanent magnets with a first permanent magnet moveable relative to a second permanent magnet with an actuator.

Referring to FIG. 4, each of workpiece interface 30 and workpiece interface 34 are closer to rotational axis 110 than either of first permanent magnet 102 and second permanent magnet 104. Between workpiece interface 30 and workpiece interface 34 is channel 50 which as mentioned herein may receive one or more sensors, stationary pins, retractable pins, retractable pin clamps, cameras, probes, and/or additional tools. Workpiece interface 30 of second north pole portion 20 and workpiece interface 34 of second south pole portion 24 provide an external north pole of magnetic coupling device 100 and an external south pole of magnetic coupling device 100, respectively, of a magnetic circuit formed with rare earth permanent magnets without any of the rare earth permanent magnets forming the magnetic circuit being positioned between second north pole portion 20 and second south pole portion 24. Further, in embodiments, each of first permanent magnet 102 and second permanent magnet 104 surround rotational axis 110 and each of first permanent magnet 102 and second permanent magnet 104 include a respective aperture to form part of channel 50.

Referring to FIG. 4, an exemplary embodiment of magnetic coupling device 10 is shown, illustratively magnetic coupling device 100. Magnetic coupling device 100 includes a switchable magnetic flux source 16 having a first permanent magnet 102 and a second permanent magnet 104. Second permanent magnet 104 is spaced apart from first permanent magnet 102. In embodiments, a spacer (not shown) is positioned between first permanent magnet 102 and second permanent magnet 104. In embodiments, each of first permanent magnet 102 and second permanent magnet 104 are rare earth permanent magnets.

Figure 5:
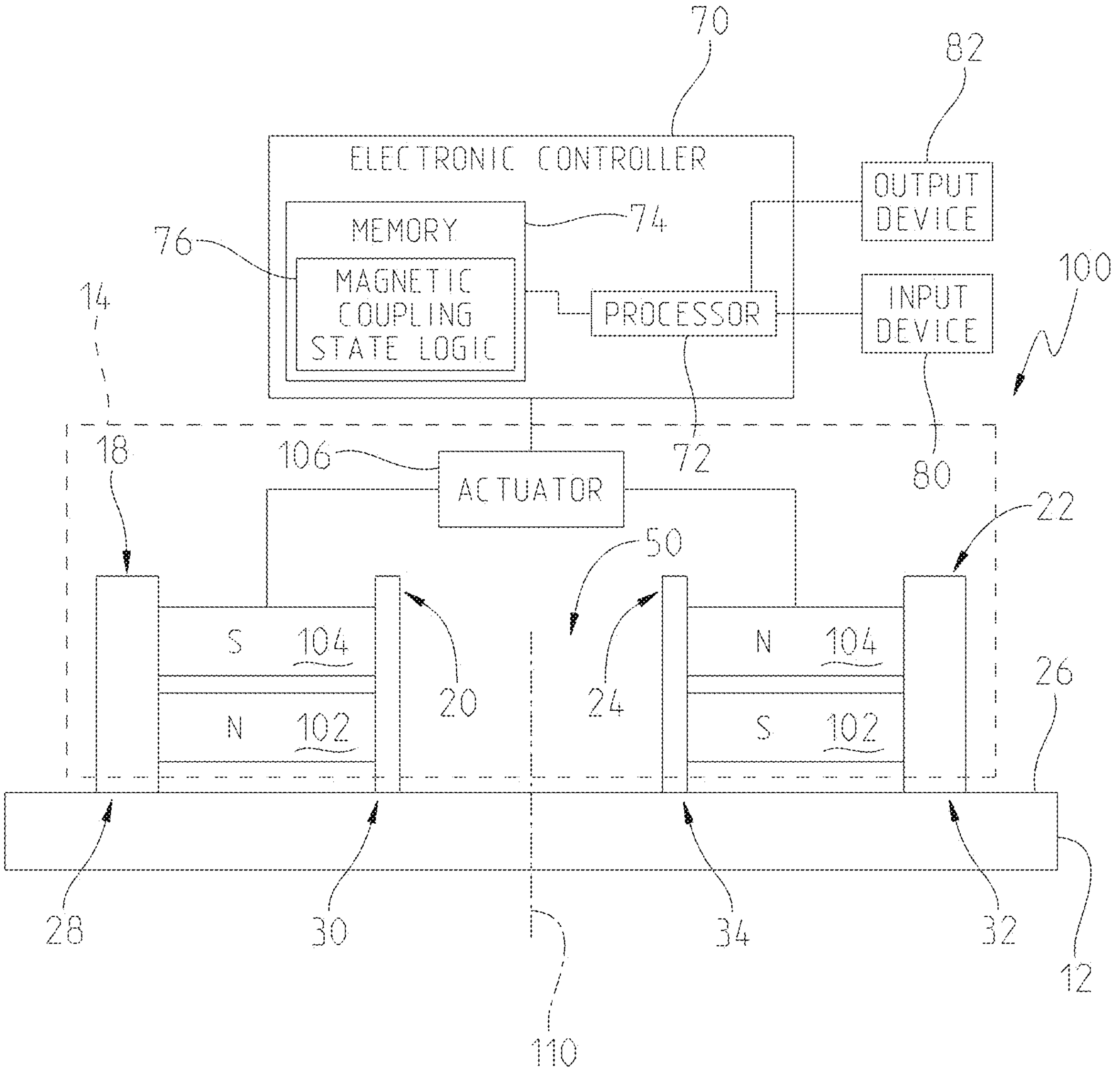
FIG. 5 illustrates the magnetic coupling device of FIG. 4 including an electronic controller operatively coupled to the actuator.

Second permanent magnet 104 is moveable relative to first permanent magnet 102. Magnetic coupling device 100 includes an actuator 106 which positions second permanent magnet 104 relative to first permanent magnet 102. Exemplary actuators 106 include manual actuators, hydraulic actuators, pneumatic actuators, mechanical actuators, electrically controlled actuators, and combinations thereof. Referring to FIG. 5, actuator 106 is an electrically controlled actuator and includes a motor (not shown) which is controlled by electronic controller 70 to position second permanent magnet 104 relative to first permanent magnet 102. Exemplary actuators are disclosed in U.S. Pat. No. 10,903,030, the entire disclosure of which is expressly incorporated by reference herein.

In embodiments, actuator 106 rotates second permanent magnet 104 relative to first permanent magnet 102 about a rotational axis 110. First permanent magnet first permanent magnet 102 is held fixed relative to housing 14. Workpiece interface 28 of first north pole portion 18, workpiece interface 30 of second north pole portion 20, workpiece interface 32 of first south pole portion 22, and workpiece interface 34 of second south pole portion 24 are magnetically coupled to first permanent magnet 102 and second permanent magnet 104. In embodiments, one or both of first permanent magnet 102 and second permanent magnet 104 are comprised of a single rare earth magnet. In embodiments, one or both of first permanent magnet 102 and second permanent magnet 104 are comprised of a multiple rare earth magnets that collectively form the respective first permanent magnet 102 or second permanent magnet 104.

In one position of second permanent magnet 104 relative to first permanent magnet 102, a north pole of second permanent magnet 104 is generally aligned with a north pole of first permanent magnet 102 and a south pole of second permanent magnet 104 is generally aligned with a south pole of first permanent magnet 102, as shown in FIG. 4. This configuration corresponds to magnetic coupling device 100 being in an ON state with workpiece interface 28 of first north pole portion 18 and workpiece interface 30 of second north pole portion 20 corresponding to an external north pole of magnetic coupling device 100 and workpiece interface 32 of first south pole portion 22 and workpiece interface 34 of second south pole portion 24 corresponding to an external south pole of magnetic coupling device 100. In the ON state, when magnetic coupling device 100 is in contact with ferromagnetic workpiece 12, a magnetic circuit is formed to magnetically couple ferromagnetic workpiece 12 to magnetic coupling device 100.

In another position of second permanent magnet 104 relative to first permanent magnet 102, a north pole of second permanent magnet 104 is generally aligned with a south pole of first permanent magnet 102 and a south pole of second permanent magnet 104 is generally aligned with a north pole of first permanent magnet 102, as shown in FIG. 5. This configuration corresponds to magnetic coupling device 100 being in an OFF state and a magnetic circuit is formed generally within housing 14; magnetic coupling device 100 lacks an external north pole at workpiece interface 28 of first north pole portion 18 and workpiece interface 30 of second north pole portion 20 and an external south pole at workpiece interface 32 of first south pole portion 22 and workpiece interface 34 of second south pole portion 24. In the OFF state, ferromagnetic workpiece 12 is not magnetically coupled to magnetic coupling device 100.

Actuator 106 rotates second permanent magnet 104 about rotational axis 110 to move second permanent magnet 104 between the positions shown in FIG. 4 and FIG. 5. In embodiments, actuator 106 is able to position second permanent magnet 104 at rotational positions between those shown in FIGS. 4 and 5. These intermediate rotational positions correspond to partial ON states of magnetic coupling device 100 with workpiece interface 28 of first north pole portion 18 and workpiece interface 30 of second north pole portion 20 corresponding to an external north pole of magnetic coupling device 100 and workpiece interface 32 of first south pole portion 22 and workpiece interface 34 of second south pole portion 24 corresponding to an external south pole of magnetic coupling device 100, but having a lower level of magnetic flux available at each of the external north pole and the external south pole. As such, magnetic coupling device 100 is able to be configured to provide a variable strength magnetic flux level to perform various operations, such as the operations disclosed in U.S. Pat. No. 10,903,030, the entire disclosure of which is expressly incorporated by reference herein.

Referring to FIG. 4, each of workpiece interface 30 and workpiece interface 34 are closer to rotational axis 110 than either of first permanent magnet 102 and second permanent magnet 104. Between workpiece interface 30 and workpiece interface 34 is channel 50 which as mentioned herein may receive one or more sensors and/or tools, such as probes. Workpiece interface 30 of second north pole portion 20 and workpiece interface 34 of second south pole portion 24 provide an external north pole of magnetic coupling device 100 and an external south pole of magnetic coupling device 100, respectively, of a magnetic circuit formed with rare earth permanent magnets without any of the rare earth permanent magnets forming the magnetic circuit being positioned between second north pole portion 20 and second south pole portion 24. Further, in embodiments, each of first permanent magnet 102 and second permanent magnet 104 surround rotational axis 110 and each of first permanent magnet 102 and second permanent magnet 104 include a respective aperture to form part of channel 50.

Figure 6:
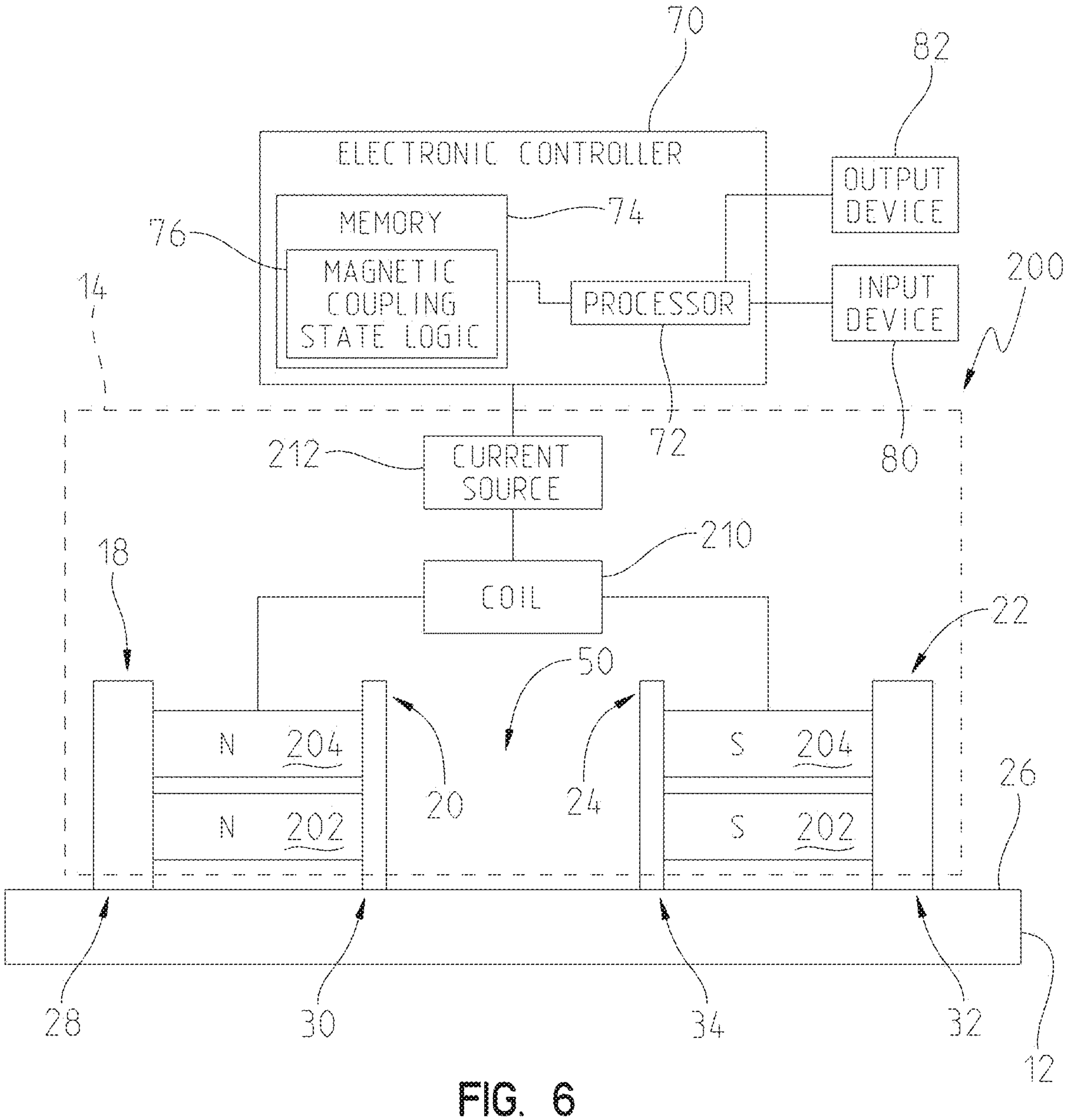
FIG. 6 illustrates a representative view of an exemplary magnetic coupling device having multiple workpiece contact interfaces for each pole of the magnetic coupling device, the magnetic coupling device including a stack of permanent magnets with a first electro-permanent magnet and a second permanent magnet.
Figure 7:
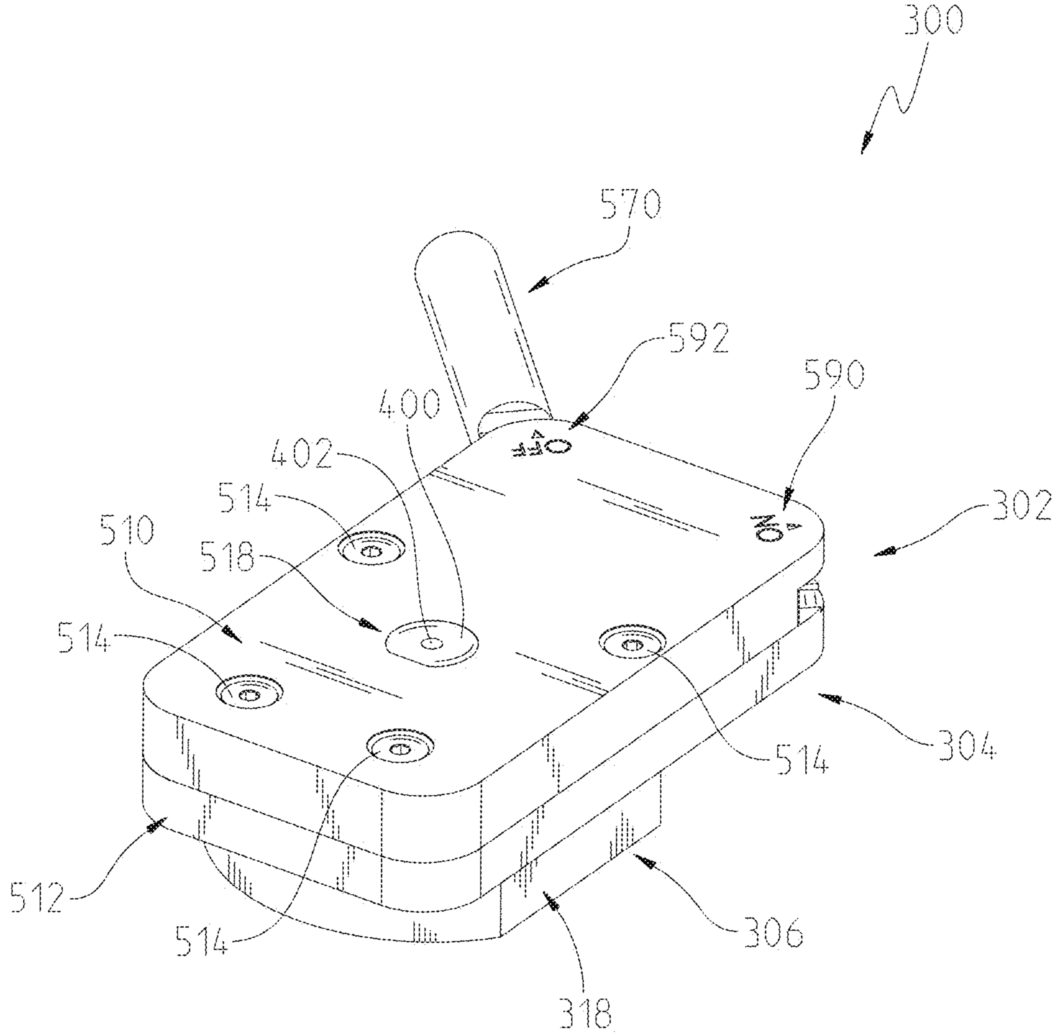
FIG. 7 illustrates a first upper perspective view of an exemplary magnetic coupling device in accordance with the magnetic coupling device of FIG. 4 having a manual actuator.

Referring to FIG. 6, an exemplary embodiment of magnetic coupling device 10 is shown, illustratively magnetic coupling device 200. Magnetic coupling device 200 includes a switchable magnetic flux source 16 having a first permanent magnet 202 and a second permanent magnet 204. Second permanent magnet 204 is spaced apart from first permanent magnet 202. In embodiments, a spacer (not shown) is positioned between first permanent magnet 202 and second permanent magnet 204 or an air gap is maintained between first permanent magnet 202 and second permanent magnet 204. In embodiments, first permanent magnet 202 is a rare earth permanent magnet and second permanent magnet 204 is an electro-permanent magnet. First permanent magnet 202 and second permanent magnet 204 are held fixed relative to housing 14. Workpiece interface 28 of first north pole portion 18, workpiece interface 30 of second north pole portion 20, workpiece interface 32 of first south pole portion 22, and workpiece interface 34 of second south pole portion 24 are magnetically coupled to first permanent magnet 202 and second permanent magnet 204.

At least a portion of second permanent magnet 204 is surrounded by a coil 210 which is coupled to a current source 212. A direction and strength of a current provided through coil 210 is controlled by electronic controller 70. The current is used to alter the pole positions for second permanent magnet 204. In embodiments, the current may be used to position a north pole of second permanent magnet 204 in general alignment with a north pole of first permanent magnet 202 and a south pole of second permanent magnet 204 is general alignment with a south pole of first permanent magnet 202, as shown in FIG. 6. The current does not need to be persistent to maintain second permanent magnet 204 in this configuration. This configuration corresponds to magnetic coupling device 200 being in an ON state with workpiece interface 28 of first north pole portion 18 and workpiece interface 30 of second north pole portion 20 corresponding to an external north pole of magnetic coupling device 200 and workpiece interface 32 of first south pole portion 22 and workpiece interface 34 of second south pole portion 24 corresponding to an external south pole of magnetic coupling device 200. In the ON state, when magnetic coupling device 200 is in contact with ferromagnetic workpiece 12, a magnetic circuit is formed to magnetically couple ferromagnetic workpiece 12 to magnetic coupling device 200. In embodiments, the magnetic mass of first permanent magnet 202 and second permanent magnet 204 may be different or the same. In embodiments, one or both of first permanent magnet 202 and second permanent magnet 204 are comprised of a permanent magnet. In embodiments, one or both of first permanent magnet 102 and second permanent magnet 104 are comprised of multiple permanent magnets that collectively form the respective first permanent magnet 102 or second permanent magnet 104.

In embodiments, the current may be used to position a north pole of second permanent magnet 204 in general alignment with a south pole of first permanent magnet 202 and a south pole of second permanent magnet 204 in general alignment with a north pole of first permanent magnet 202. This configuration corresponds to magnetic coupling device 200 being in an OFF state and a magnetic circuit is formed generally within housing 14; magnetic coupling device 200 lacks an external north pole at workpiece interface 28 of first north pole portion 18 and workpiece interface 30 of second north pole portion 20 and an external south pole at workpiece interface 32 of first south pole portion 22 and workpiece interface 34 of second south pole portion 24. In the OFF state, ferromagnetic workpiece 12 is not magnetically coupled to magnetic coupling device 100.

In embodiments, the electro permanent magnet of the second permanent magnet 204 may be charged to different levels to provide a variable magnetic strength at the workpiece interfaces 28, 30, 32, 34. Thus, at least one partial ON state may be configured having a magnetic strength at the workpiece interfaces 28, 30, 32, 34 being less than the ON state and greater than the OFF state. Exemplary electro-permanent magnets include AlNiCo electro-permanent magnets.

Referring to FIG. 6, between workpiece interface 30 and workpiece interface 34 is channel 50 which as mentioned herein may receive one or more sensors and/or tools, such as probes. In embodiments, each of first permanent magnet 102 and second permanent magnet 104 surround rotational axis 110 and each of first permanent magnet 102 and second permanent magnet 104 include a respective aperture to form part of channel 50.

Referring to FIGS. 7-21, an exemplary magnetic coupling device 300 is shown. Magnetic coupling device 300 is similar in structure to magnetic coupling device 100. Magnetic coupling device 300 includes a housing 302. Housing 302 is a multi-piece housing. Magnetic coupling device 300 includes an actuator assembly 304 and a magnet and pole piece assembly 306.

Figure 12:
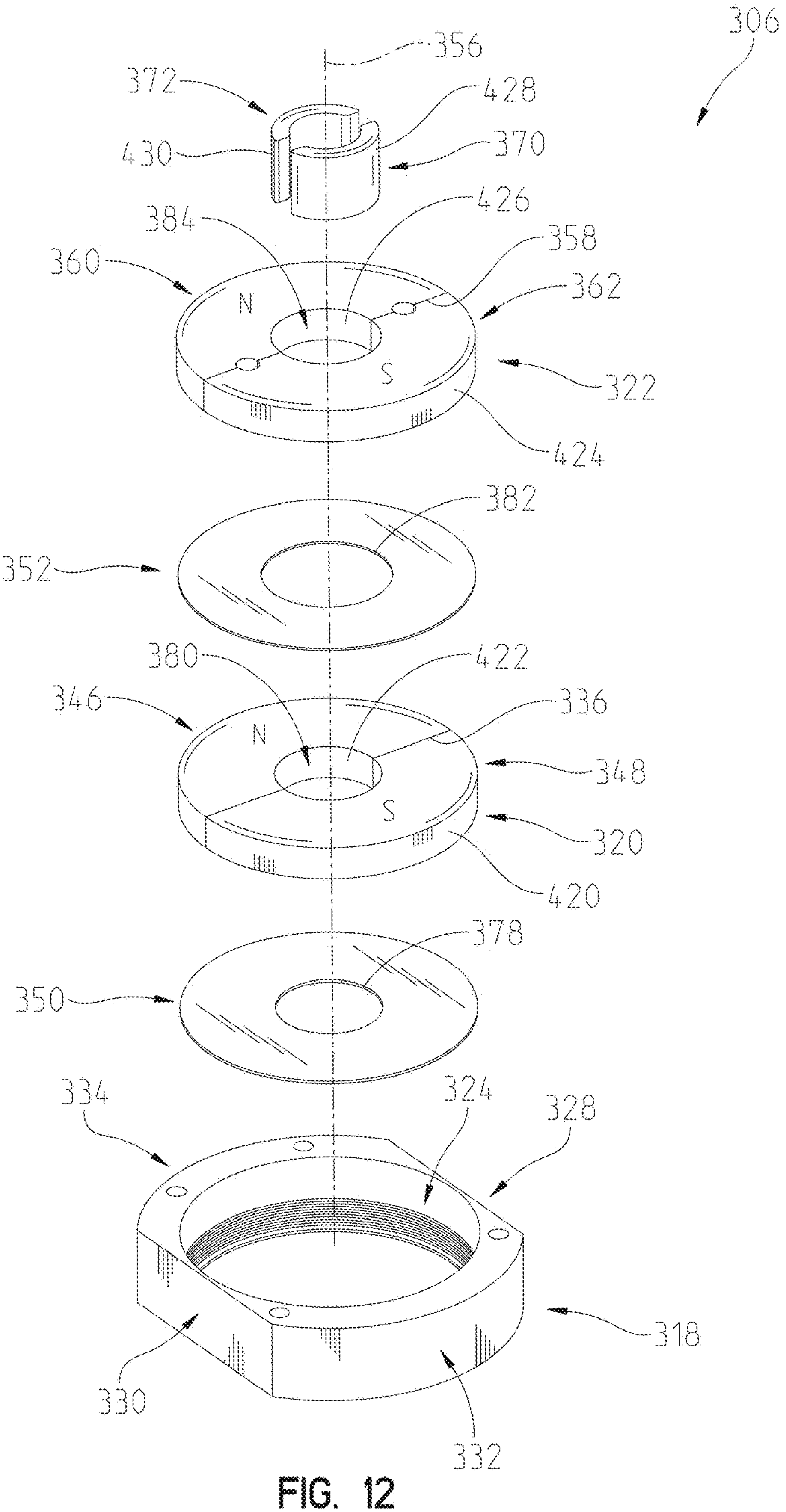
FIG. 12 illustrates an exploded view of a magnet and pole piece assembly of the magnetic coupling device of FIG. 7.

Referring to FIG. 12, magnet and pole piece assembly 306 includes a first permanent magnet 320 and a second permanent magnet 322. In the illustrated embodiment, each of first permanent magnet 320 and second permanent magnet 322 are rare earth permanent magnets.

Figure 13:
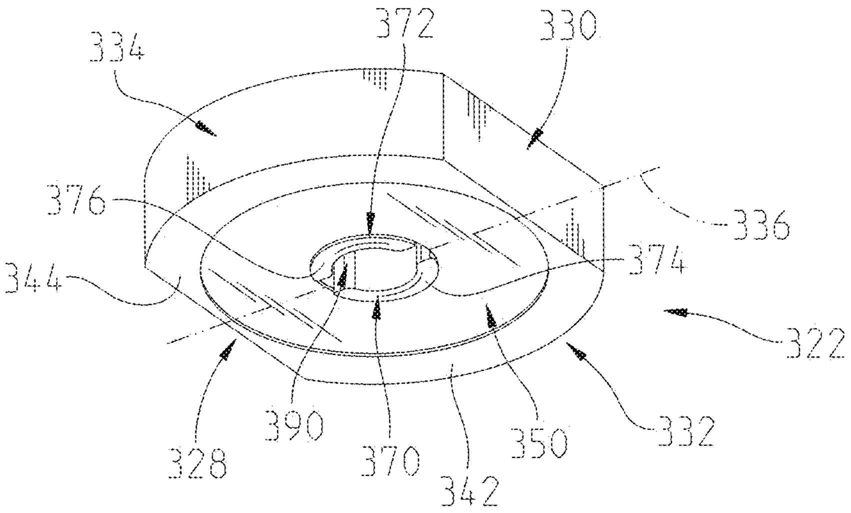
FIG. 13 illustrates a lower perspective view of the magnet and pole piece assembly of FIG. 12 including a plurality of workpiece contact interfaces.
Figure 14:
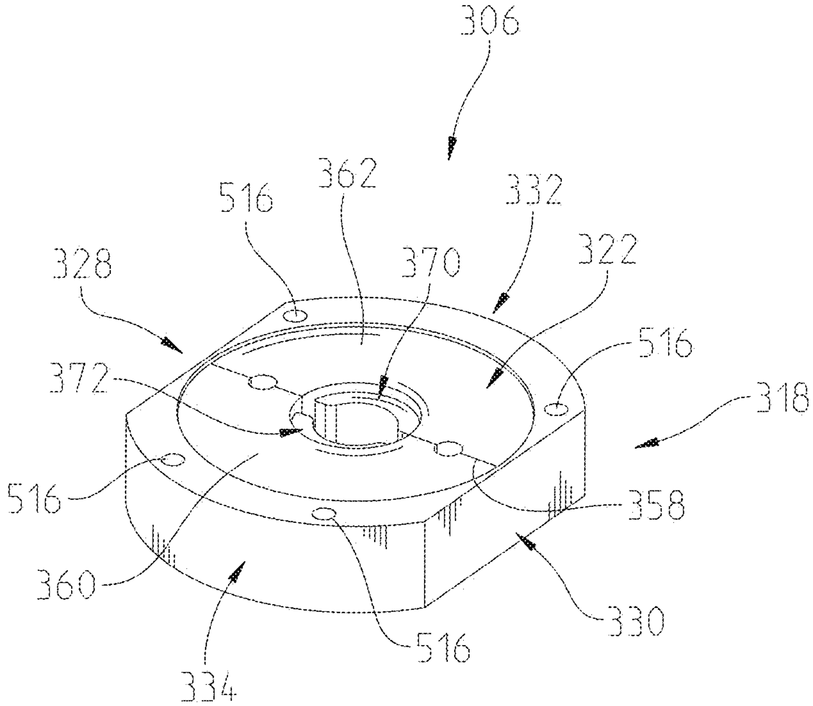
FIG. 14 illustrates an upper perspective view of magnet and pole piece assembly of FIG. 12.

Magnet and pole piece assembly 306 includes a housing 318 having an opening 324 therethrough. Housing 318 is made of a ferromagnetic material. An exemplary ferromagnetic material is steel. An inwardly extending lip 326 (see FIG. 16) is provided at a lower portion of housing 318. Housing 318 is dimensioned such that only thin wall webs 328 and 330 connect a first thick walled housing portion 332 and a second thick walled housing portion 334. Each of first thick walled housing portion 332 and second thick walled housing portion 334 provide integral pole extension pieces of magnetic coupling device 300. Referring to FIG. 13, first thick walled housing portion 332 includes a workpiece engagement surface 342 and second thick walled housing portion 334 includes a workpiece engagement surface 344. First permanent magnet 320 is secured in housing 318 with a N-S pole separation plane 336 extending (bridging) between thin wall webs 328, 330 resulting in a north pole portion 346 of first permanent magnet 320 being positioned adjacent second thick walled housing portion 334 of housing 318 and a south pole portion 348 of first permanent magnet 320 being positioned adjacent first thick walled housing portion 332 of housing 318.

Referring to FIG. 12, during assembly, a spacer 350 is received in opening 324 of housing 318 and is supported by lip 326 of housing 318. First permanent magnet 320 is supported by a spacer 350 and secured to housing 318. In embodiments, spacer 350 is non-ferromagnetic. In embodiments, spacer 350 is ferromagnetic. In embodiments, first permanent magnet 320 is secured to housing 318 with an adhesive, a mechanical interference, and/or a fastener. A second non-ferromagnetic spacer 352 is placed on top of first permanent magnet 320 and separates second permanent magnet 322 from first permanent magnet 320. Second permanent magnet 322 is also received in opening 324 of housing 318 and is rotatable relative to housing 318 and first permanent magnet 320 about an axis 356. Second permanent magnet 322 has a N-S pole separation plane 358 dividing a north pole portion 360 of second permanent magnet 322 and a south pole portion 362 of second permanent magnet 322.

Figure 16:
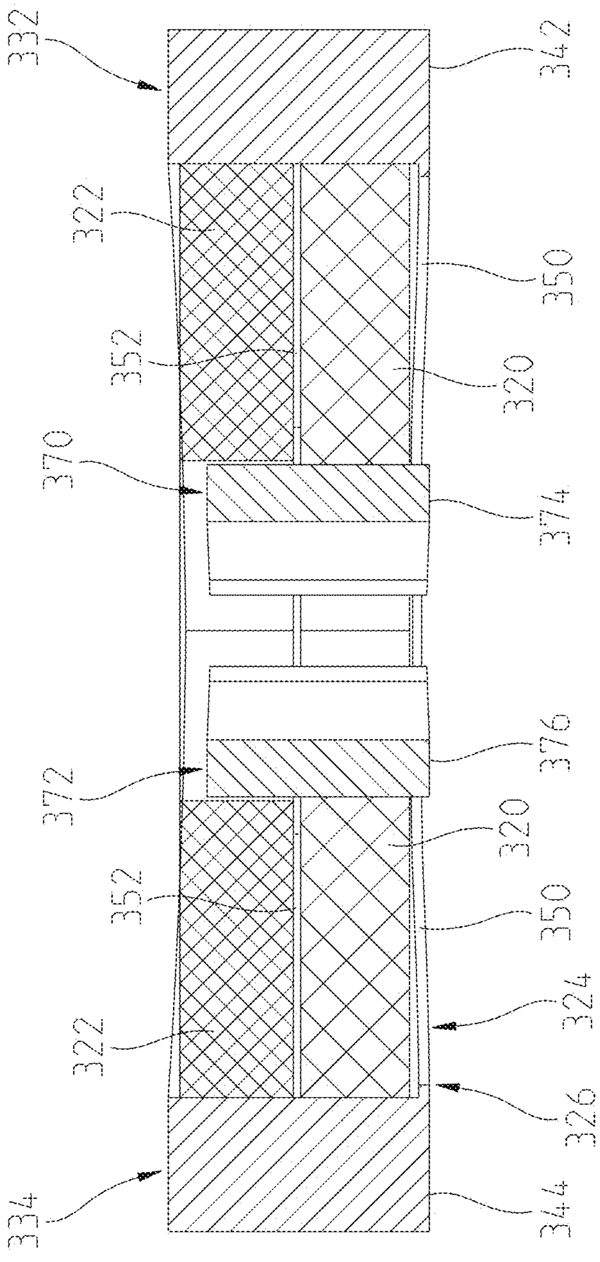
FIG. 16 illustrates a second sectional view of the magnet and pole piece assembly of FIG. 12 of the magnetic coupling device of FIG. 7.

Magnet and pole piece assembly 306 further includes a first pole member 370 and a second pole member 372. Referring to FIG. 13, first pole member 370 includes a workpiece engagement surface 374 and second pole member 372 includes a workpiece engagement surface 376. Each of first pole member 370 and second pole member 372 are received in an opening 378 in spacer 350, an opening 380 in first permanent magnet 320, an opening 382 in second non-ferromagnetic spacer 352, and an opening 384 in second permanent magnet 322. As shown in FIG. 16, each of workpiece engagement surface 342 of first thick walled housing portion 332, workpiece engagement surface 344 of second thick walled housing portion 334, workpiece engagement surface 374 of first pole member 370, and workpiece engagement surface 376 of second pole member 372 are positioned lower than spacer 350. Further, each of first pole member 370 and second pole member 372 have an arcuate outer shape to generally match the shape of opening 380 in first permanent magnet 320 and the shape of opening 384 in second permanent magnet 322 and provide good magnetic transfer therebetween. Opening 378 of spacer 350, Opening 380 of first permanent magnet 320, opening 382 of second non-ferromagnetic spacer 352, and opening 384 of second permanent magnet 322, collectively form a channel 390 (see FIGS. 13 and 14) which receives first pole member 370 and second pole member 372.

Referring to FIG. 13, N-S pole separation plane 336 of first permanent magnet 320 is represented. As shown, first pole member 370 is spaced apart from second pole member 372. First pole member 370 is positioned on the same side of N-S pole separation plane 336 as first thick walled housing portion 332. Thus, each of workpiece engagement surface 342 of first thick walled housing portion 332 and workpiece engagement surface 374 of first pole member 370 are south pole extension portions of first permanent magnet 320 and second permanent magnet 322 when first permanent magnet 320 and second permanent magnet 322 are aligned and collectively form an external south pole for magnetic coupling device 300. Second pole member 372 is positioned on the same side of N-S pole separation plane 336 as second thick walled housing portion 334. Thus, each of workpiece engagement surface 344 of second thick walled housing portion 334 and workpiece engagement surface 376 of second pole member 372 are north pole extension portions of first permanent magnet 320 and second permanent magnet 322 when first permanent magnet 320 and second permanent magnet 322 are aligned and collectively form an external north pole for magnetic coupling device 300.

Figure 17:
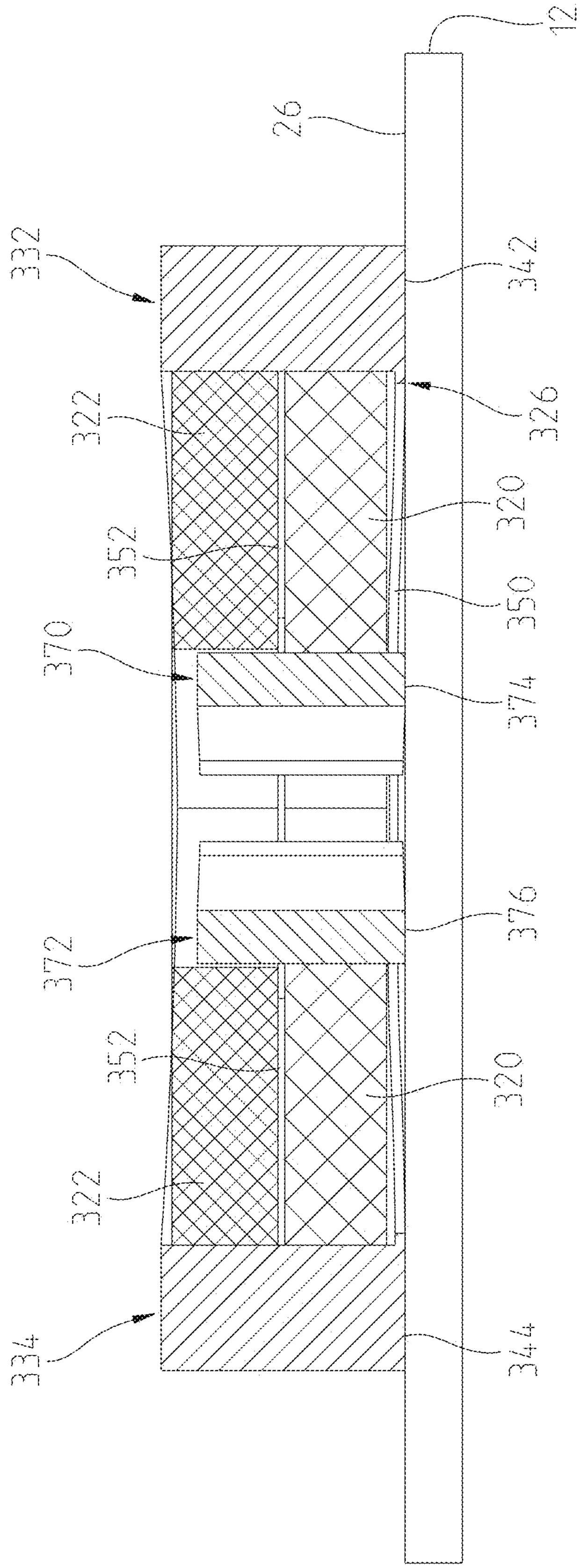
FIG. 17 illustrates the sectional view of FIG. 16 with the magnet and pole piece assembly of FIG. 12 of the magnetic coupling device of FIG. 7 supported on a ferromagnetic workpiece.

Referring to FIGS. 13 and 17, workpiece engagement surface 342 of first thick walled housing portion 332, workpiece engagement surface 344 of second thick walled housing portion 334, workpiece engagement surface 374 of first pole member 370, and workpiece engagement surface 376 of second pole member 372 are planar, parallel, and positioned in a common plane. In embodiments, the shape of each of workpiece engagement surface 342 of first thick walled housing portion 332, workpiece engagement surface 344 of second thick walled housing portion 334, workpiece engagement surface 374 of first pole member 370, and workpiece engagement surface 376 of second pole member 372 is contoured to a shape of ferromagnetic workpiece 12. Further, in embodiments, one or more of workpiece engagement surface 342 of first thick walled housing portion 332, workpiece engagement surface 344 of second thick walled housing portion 334, workpiece engagement surface 374 of first pole member 370, and workpiece engagement surface 376 of second pole member 372 include spaced apart projections, such as the projections disclosed in US Published Patent Application No. 20210031317, the entire disclosure of which is expressly incorporated by reference herein.

Figure 19:
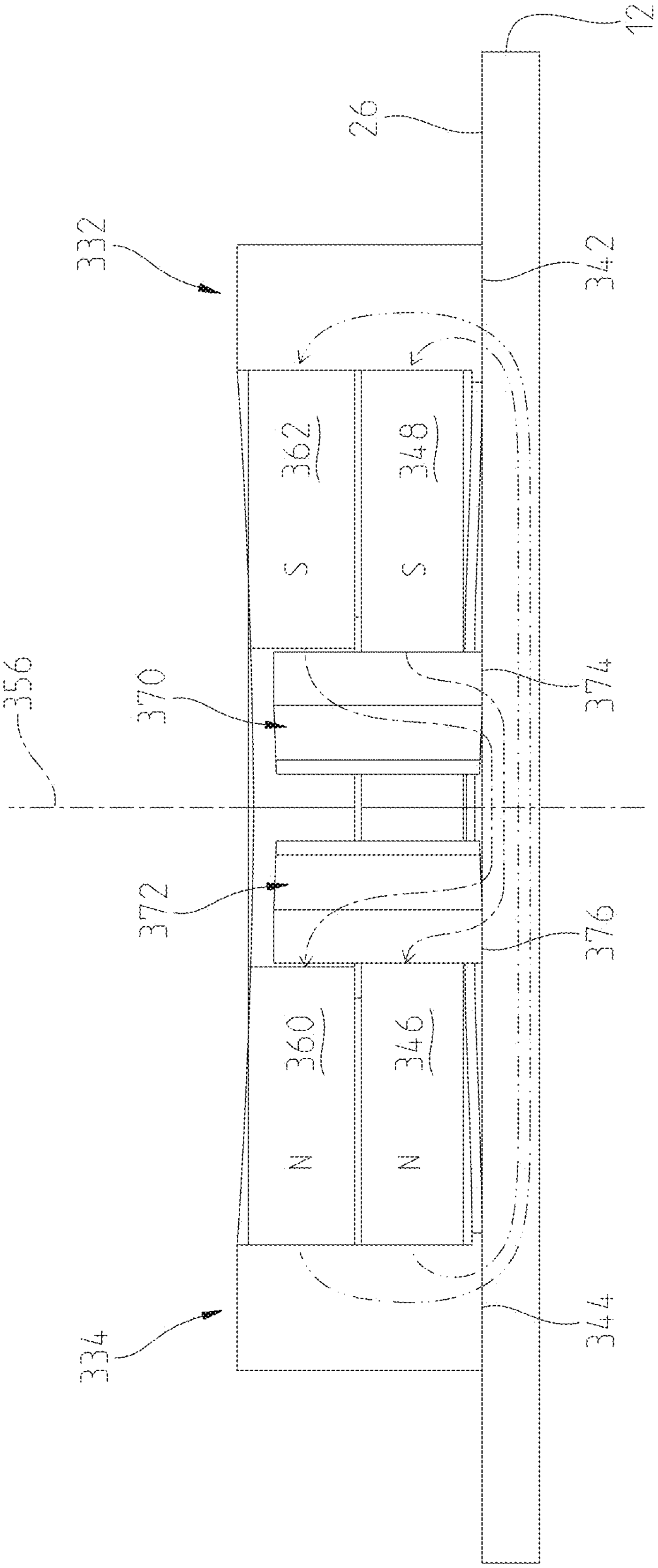
FIG. 19 illustrates the arrangement of FIG. 17 with the magnetic coupling device in an ON state.

In one position of second permanent magnet 322 relative to first permanent magnet 320, north pole portion 360 of second permanent magnet 322 is generally aligned with north pole portion 346 of first permanent magnet 320 and south pole portion 362 of second permanent magnet 322 is generally aligned with south pole portion 348 of first permanent magnet 320, as shown in FIG. 19. This configuration corresponds to magnetic coupling device 300 being in an ON state with workpiece engagement surface 344 of workpiece engagement surface 342 and workpiece engagement surface 376 of second pole member 372 corresponding to an external north pole of magnetic coupling device 300 and workpiece engagement surface 342 of first thick walled housing portion 332 and workpiece engagement surface 374 of first pole member 370 corresponding to an external south pole of magnetic coupling device 300. In the ON state, when magnetic coupling device 300 is in contact with ferromagnetic workpiece 12, a magnetic circuit is formed to magnetically couple ferromagnetic workpiece 12 to magnetic coupling device 300.

Figure 18:
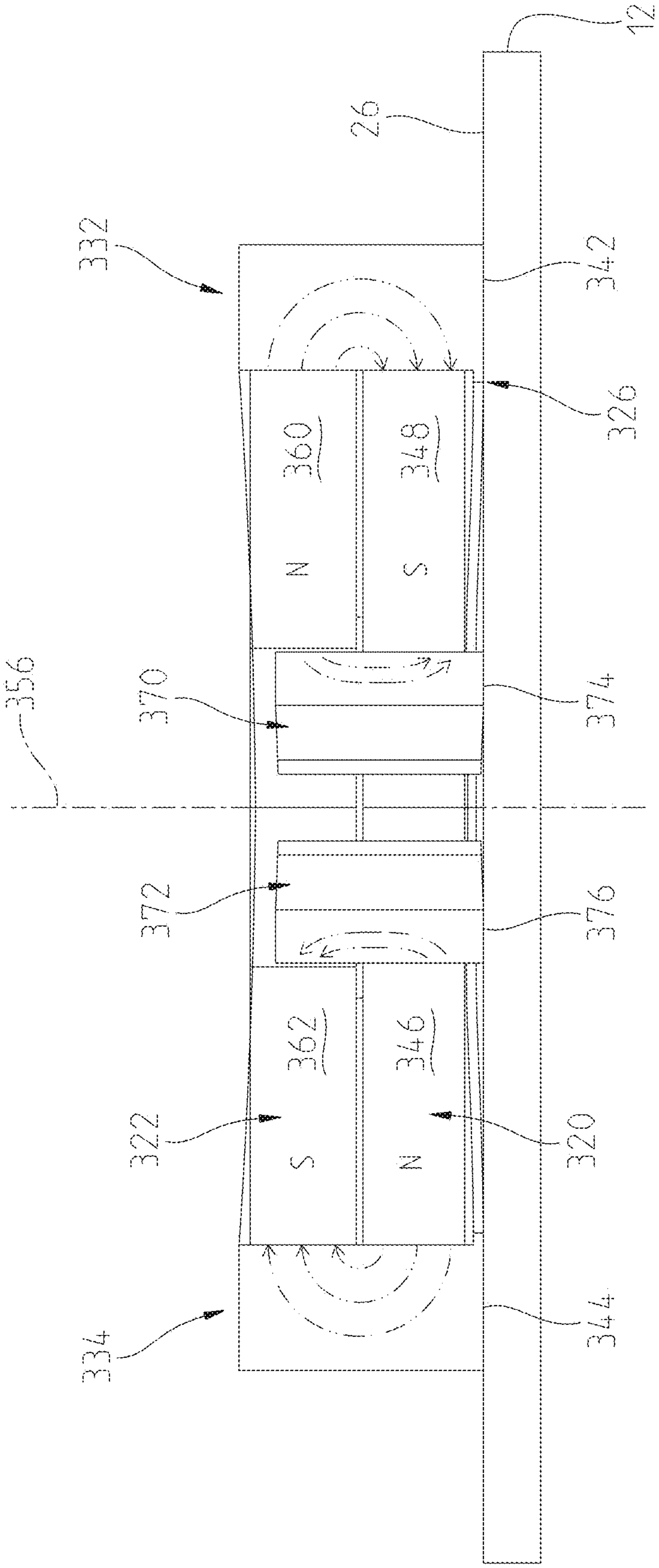
FIG. 18 illustrates the arrangement of FIG. 17 with the magnetic coupling device in an OFF state.

In another position of second permanent magnet 322 relative to first permanent magnet 320, north pole portion 360 of second permanent magnet 322 is generally aligned with south pole portion 348 of first permanent magnet 320 and south pole portion 362 of second permanent magnet 322 is generally aligned with north pole portion 346 of first permanent magnet 320, as shown in FIG. 18. This configuration corresponds to magnetic coupling device 300 being in an OFF state and a magnetic circuit is formed generally within housing 318; magnetic coupling device 300 lacks an external north pole at workpiece engagement surface 344 of workpiece engagement surface 342 and workpiece engagement surface 376 of second pole member 372 and an external south pole at workpiece engagement surface 342 of first thick walled housing portion 332 and workpiece engagement surface 374 of first pole member 370. In the OFF state, ferromagnetic workpiece 12 is not magnetically coupled to magnetic coupling device 300.

As described in more detail herein, an actuator assembly 500 (see FIG. 11) rotates second permanent magnet 322 about axis 356 to move second permanent magnet 322 between the positions shown in FIG. 18 and FIG. 19. In embodiments, actuator assembly 500 is able to position second permanent magnet 322 at rotational positions between those shown in FIGS. 18 and 19. These intermediate rotational positions correspond to partial ON states of magnetic coupling device 300 with workpiece engagement surface 344 of workpiece engagement surface 342 and workpiece engagement surface 376 of second pole member 372 corresponding to an external north pole of magnetic coupling device 300 and workpiece engagement surface 342 of first thick walled housing portion 332 and workpiece engagement surface 374 of first pole member 370 corresponding to an external south pole of magnetic coupling device 300, but having a lower level of magnetic flux available at each of the external north pole and the external south pole. As such, magnetic coupling device 300 is able to be configured to provide a variable strength magnetic flux level to perform various operations, such as the operations disclosed in U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosures of which are expressly incorporated by reference herein.

Figure 15:
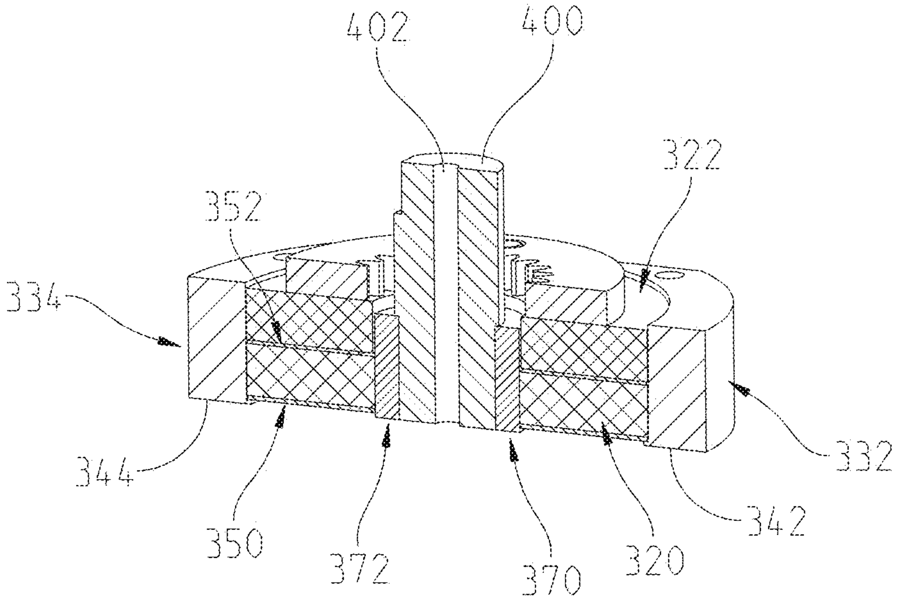
FIG. 15 illustrates a first sectional view of a portion of the magnetic coupling device of FIG. 7.

Referring to FIG. 15, first pole member 370 and second pole member 372 are carried by a support 400. In embodiments, first pole member 370 and second pole member 372 are secured to support 400 with adhesive. Support 400 is non-ferromagnetic which is received in channel 390 of magnet and pole piece assembly 306. Support 400 includes a central channel 402. One or more of sensors, stationary pins, retractable pins, probes, and/or additional tools may be moved through central channel 402 of support 400 or wires coupled to sensors carried by support 400 may be routed through central channel 402 of support 400. As described herein, support 400 is secured to actuator assembly 304 of magnetic coupling device 300.

Figure 10:
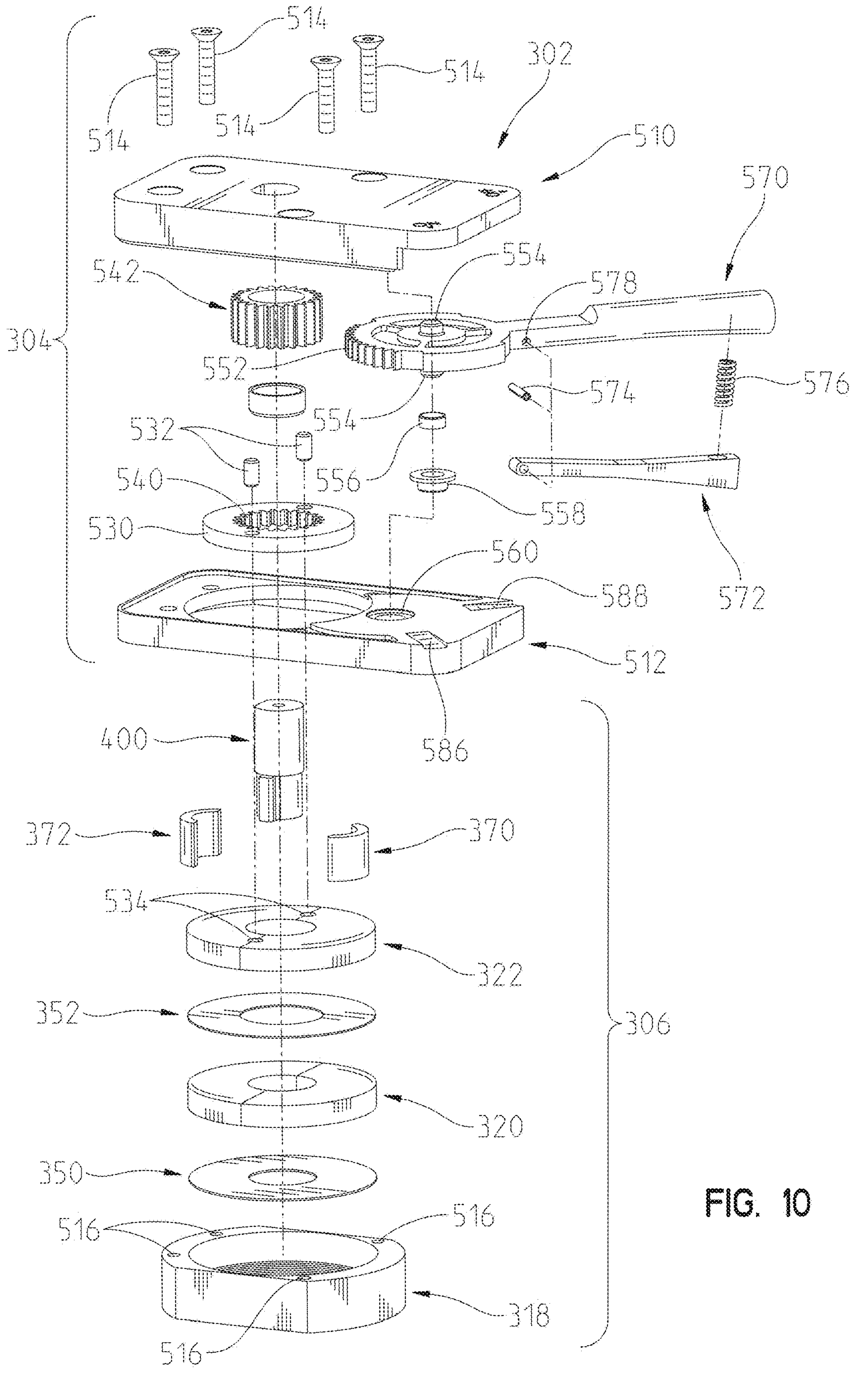
FIG. 10 illustrates an exploded assembly view of the magnetic coupling device of FIG. 7.
Figure 11:
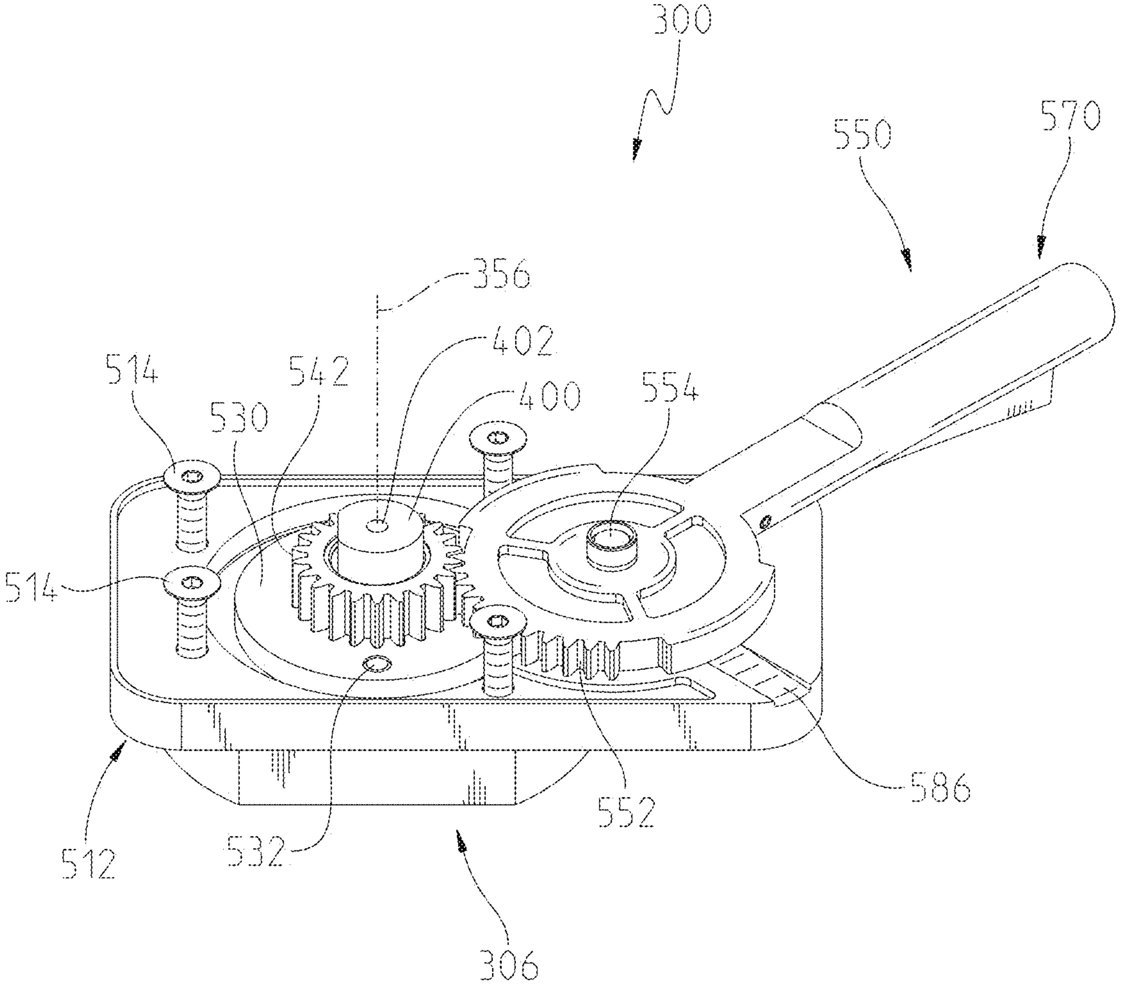
FIG. 11 illustrates a third upper perspective view of the magnetic coupling device of FIG. 7 with a portion of a housing removed to illustrate an actuation assembly of the magnetic coupling device of FIG. 7.

Referring to FIG. 10, components of actuator assembly 304 are shown. Housing 302 includes an upper housing 510 and a lower housing 512. Upper housing 510, lower housing 512, and housing 318 are secured together through fasteners 514 which are received in openings in upper housing 510 and lower housing 512 and threaded into respective apertures 516 in housing 318. A top portion 410 of support 400 is press fit in opening 518 of upper housing 510 (see FIG. 7) or otherwise secured to housing 302 of magnetic coupling device 300.

An engagement member 530 is coupled to second permanent magnet 322 which couplers 532 which are received in corresponding recesses 534 in second permanent magnet 322. An inner opening 540 of engagement member 530 is profiled to mesh with the teeth of a gear wheel 542 (see FIG.

11). As such, second permanent magnet 322 and gear wheel 542 rotate about axis 356 as a unit due to the coupling of engagement member 530.

An actuator 550 is operatively coupled to gear wheel 542 to rotate gear wheel 542 about axis 356 and thus second permanent magnet 322 about axis 356. Actuator 550 includes a gear tooth portion which intermeshes with the teeth of gear wheel 542. Actuator 550 further includes a pin 554 which extends from both a lower side and an upper side of actuator 550. Pin 554 is received in recess 560 in lower housing 512 and a corresponding recess (not shown) in upper housing 510. Bushings 556 and 558 are provided between pin 554 and upper housing 510 and pin 554 and lower housing 512, respectively.

Actuator 550 further includes an operator actuatable handle 570. Actuator 550 also includes a lock operator 572. Lock operator 572 is rotatably coupled to operator actuatable handle 570 about pin 574 which is received in apertures 578 of operator actuatable handle 570. A distal end of lock operator 572 is biased away from operator actuatable handle 570 with a spring 576.

Figure 8:
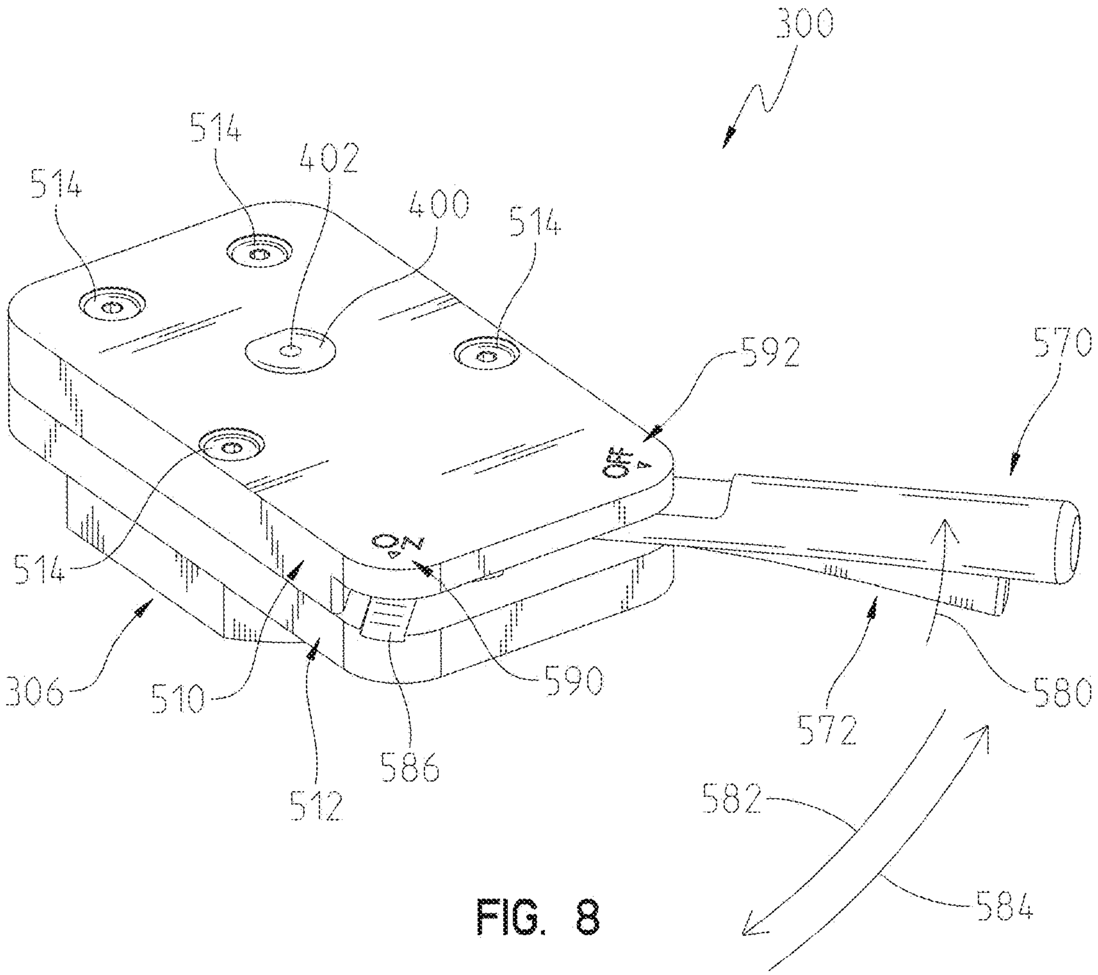
FIG. 8 illustrates a second upper perspective view of the magnetic coupling device of FIG. 7.
Figure 9:
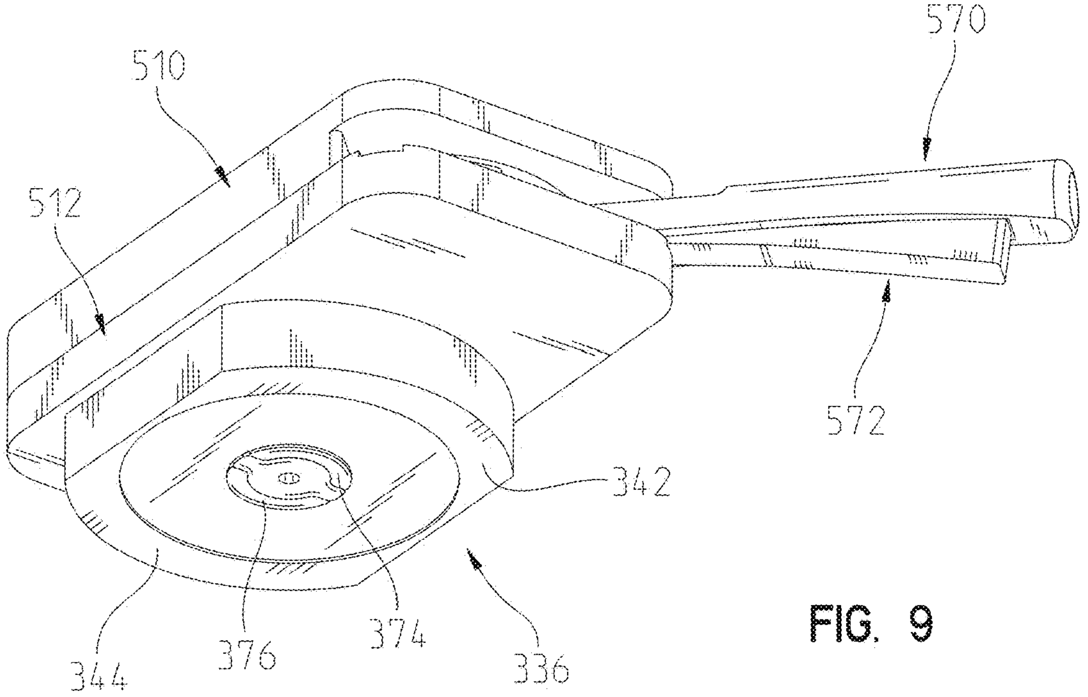
FIG. 9 illustrates a first lower perspective view of the magnetic coupling device of FIG. 7.

Referring to FIG. 8, lock operator 572 may be rotated upward by an operator in direction 580 into a recess in operator actuatable handle 570 to permit movement of operator actuatable handle 570 in one of direction 582 and 584. When released, lock operator 572 may be received in one of ON lock recess 586 and OFF lock recess 588 (see FIG. 10). Housing 302 includes a first indicia 590 indicating an ON state of magnetic coupling device 300 and a second indicia 592 indicating an OFF state of magnetic coupling device 300.

When actuator 550 is in the position shown in FIG. 8 with lock operator 572 in OFF lock recess 588, magnetic coupling device 300 is in the OFF state with second permanent magnet 322 in the position shown in FIG. 18 relative to first permanent magnet 320. An operator may depress lock operator 572 to move lock operator 572 in direction 580 and out of OFF lock recess 588. The operator may then move operator actuatable handle 570 in direction 582 till lock operator 572 is above ON lock recess 586. The operator then releases lock operator 572 which is received in ON lock recess 586. The rotation of operator actuatable handle 570 causes a corresponding rotation of gear wheel 542 and in turn second permanent magnet 322 relative to first permanent magnet 320. When lock operator 572 is in ON lock recess 586, magnetic coupling device 300 is in the ON state with second permanent magnet 322 in the position shown in FIG. 19 relative to first permanent magnet 320. The process is reversed to transition magnetic coupling device 300 from the ON state to the OFF state.

Each of first pole member 370 and second pole member 372 is an exemplary ferromagnetic insert. The magnets 320, 322 of magnetic coupling device 300 form an exemplary switchable magnetic flux source. As illustrated in FIG. 12, first permanent magnet 320 and second permanent magnet 322 are each ring magnets. Each of first permanent magnet 320 and second permanent magnet 322 are permanent magnets and in embodiments are both rare earth permanent magnets. First permanent magnet 320 includes a first outer circumferential surface 420 and a first inner circumferential surface 422 which defines opening 380. Second permanent magnet 322 includes a second outer circumferential surface 424 and a second inner circumferential surface 426 which defines opening 384. Ferromagnetic insert 370 includes an outer arcuate surface 428 positioned adjacent the first inner circumferential surface 422 of the first permanent ring magnet 320 (see FIG. 15). Ferromagnetic insert 372 includes an outer arcuate surface 430 positioned adjacent the second inner circumferential surface 426 of the second permanent magnet 322 (see FIG. 15). Ferromagnetic insert 370 remains stationary relative to the first permanent ring magnet 320 as the second permanent ring magnet 322 rotates relative to the first permanent ring magnet 320. Ferromagnetic insert 372 remains stationary relative to the first permanent ring magnet 320 as the second permanent ring magnet 322 rotates relative to the first permanent ring magnet 320. Each of the first outer arcuate surface 428 of the first ferromagnetic insert 370 and the second outer arcuate surface 430 of the second ferromagnetic insert 372 are positioned closer to the axis 356 than the first permanent ring magnet 320 and the second permanent ring magnet 322. The first outer arcuate surface 428 of the first ferromagnetic insert 370 contacts the first inner circumferential surface 422 of the first permanent ring magnet 320. The first outer arcuate surface 430 of the first ferromagnetic insert 372 contacts the second inner circumferential surface 426 of the second permanent ring magnet 322.

The switchable magnetic flux has a first configuration wherein a north pole of the second permanent ring magnet 322 is aligned relative to a north pole of the first permanent ring magnet 320 and a second configuration wherein a south pole of the second permanent ring magnet 322 is aligned relative to the north pole of the first permanent magnet 320. Workpiece engagement surfaces 342 and 344 of first thick walled housing portion 332 and second thick walled housing portion 334 are adapted to contact a ferromagnetic workpiece.

Figure 20:
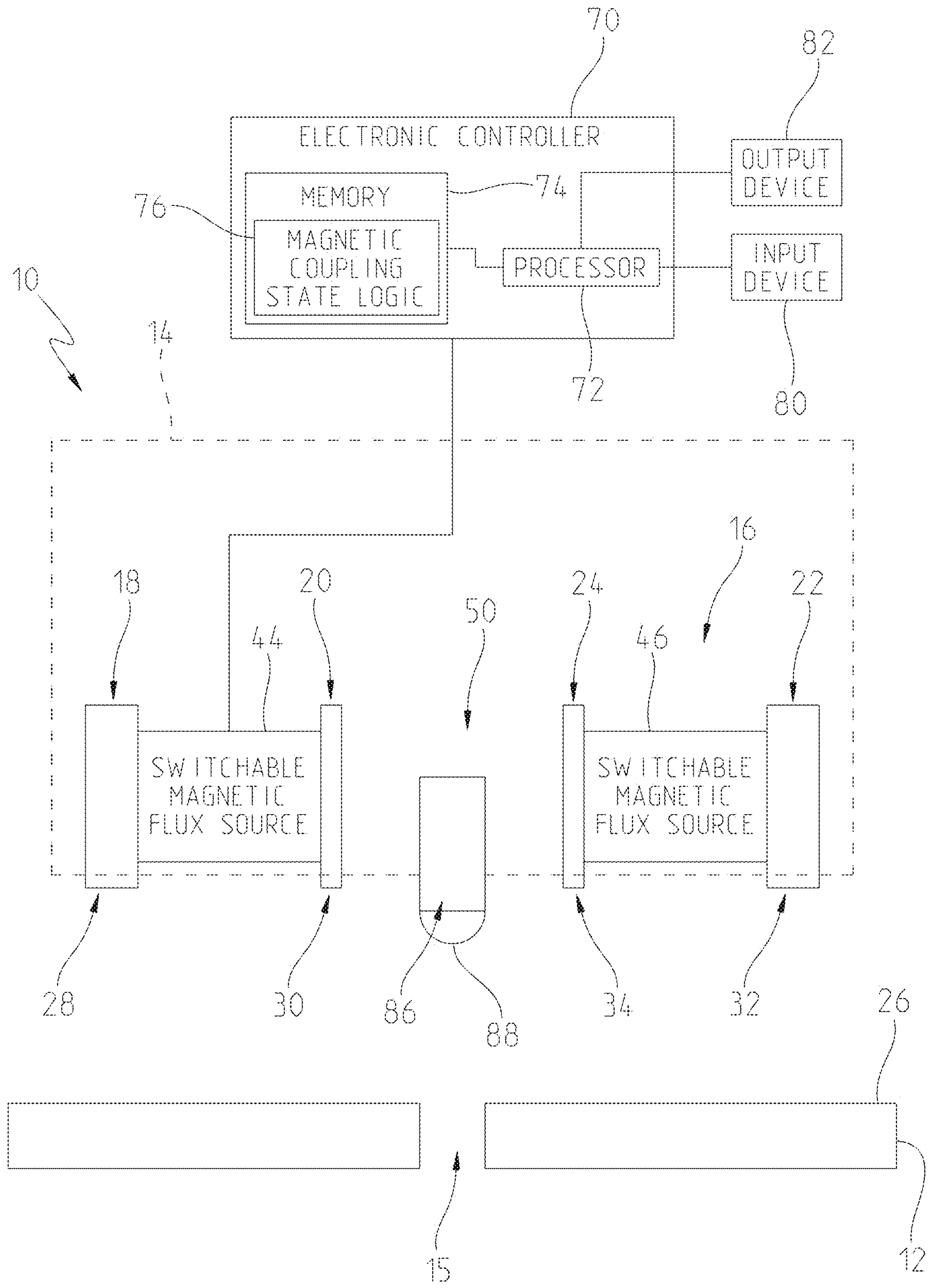
FIG. 20 illustrates the magnetic coupling device of FIG. 1 spaced apart from a ferromagnetic workpiece and having a locator positioned in a channel of the magnetic coupling device.
Figure 21:
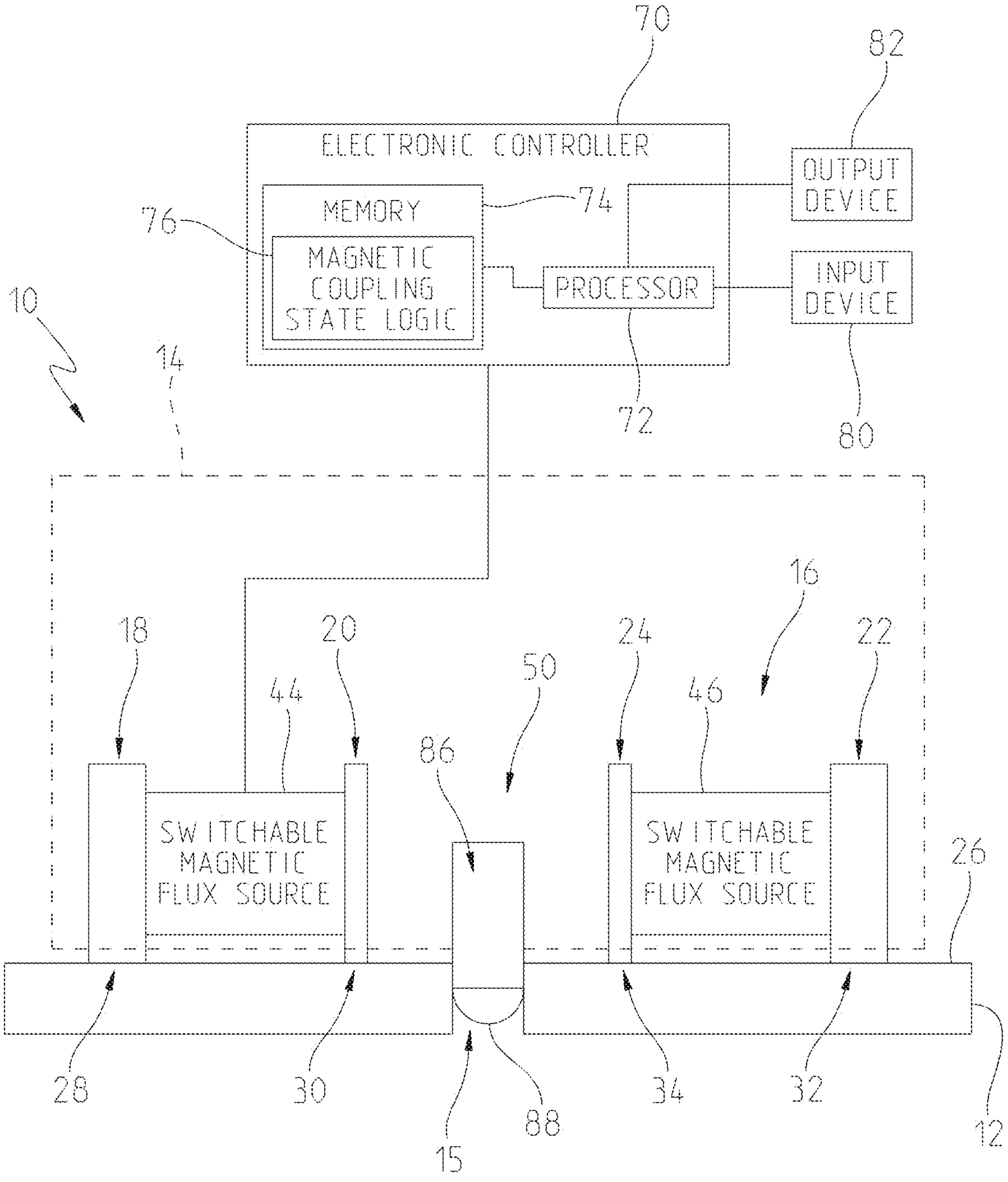
FIG. 21 illustrates the magnetic coupling device of FIG. 20 with the locator received in a locator feature of the ferromagnetic workpiece.

Referring to FIG. 20, an embodiment of magnetic coupling tool 10 is shown which includes at least one locator 86. Locator 86 illustratively is a stationary pin which is carried by housing 14. Locator 86 includes a lowermost extent 88 which extends away from housing 14. As shown in FIG. 21, the lowermost extent 88 of at least one locator 86 extends into a locating feature 15, illustratively a hole, in ferromagnetic workpiece 12. The lowermost extent 88 of at least one locator 86 is lower than workpiece interface 30 of second north pole portion 20 and workpiece interface 34 of second south pole portion 24 which contact surface 26 of ferromagnetic workpiece 12. In embodiments, the relative position of the lowermost extent 88 of at least one locator 86 is lower than workpiece interface 30 of second north pole portion 20 and workpiece interface 34 of second south pole portion 24 remains constant when magnetic coupling tool 10 is spaced apart from ferromagnetic workpiece 12 and when magnetic coupling tool 10 is coupled to ferromagnetic workpiece 12. In other embodiments, at least one locator 86 is positioned completely within housing 14 and receives a protrusion of ferromagnetic workpiece 12 to locate magnetic coupling tool 10 relative to ferromagnetic workpiece 12.

In embodiments, ferromagnetic workpiece 12 does not include a locating feature and at least one locator 86 is retractable from an extended position wherein the lowermost extent 88 of 86 extends lower than workpiece interface 30 of second north pole portion 20 and workpiece interface 34 of second south pole portion 24 to a retracted position wherein the lowermost extent 88 of at least one locator 86 is one of aligned with one or both lower than workpiece interface 30 of second north pole portion 20 and workpiece interface 34 of second south pole portion 24 or the lowermost extent 88 of at least one locator 86 is retracted relative to housing 14 so that the lowermost extent 88 of at least one locator 86 remains spaced apart from ferromagnetic workpiece 12 when workpiece interface 30 of second north pole portion 20 and workpiece interface 34 of second south pole portion 24 contact ferromagnetic workpiece 12. Exemplary retracting locators include retractable pins.

Figure 22:
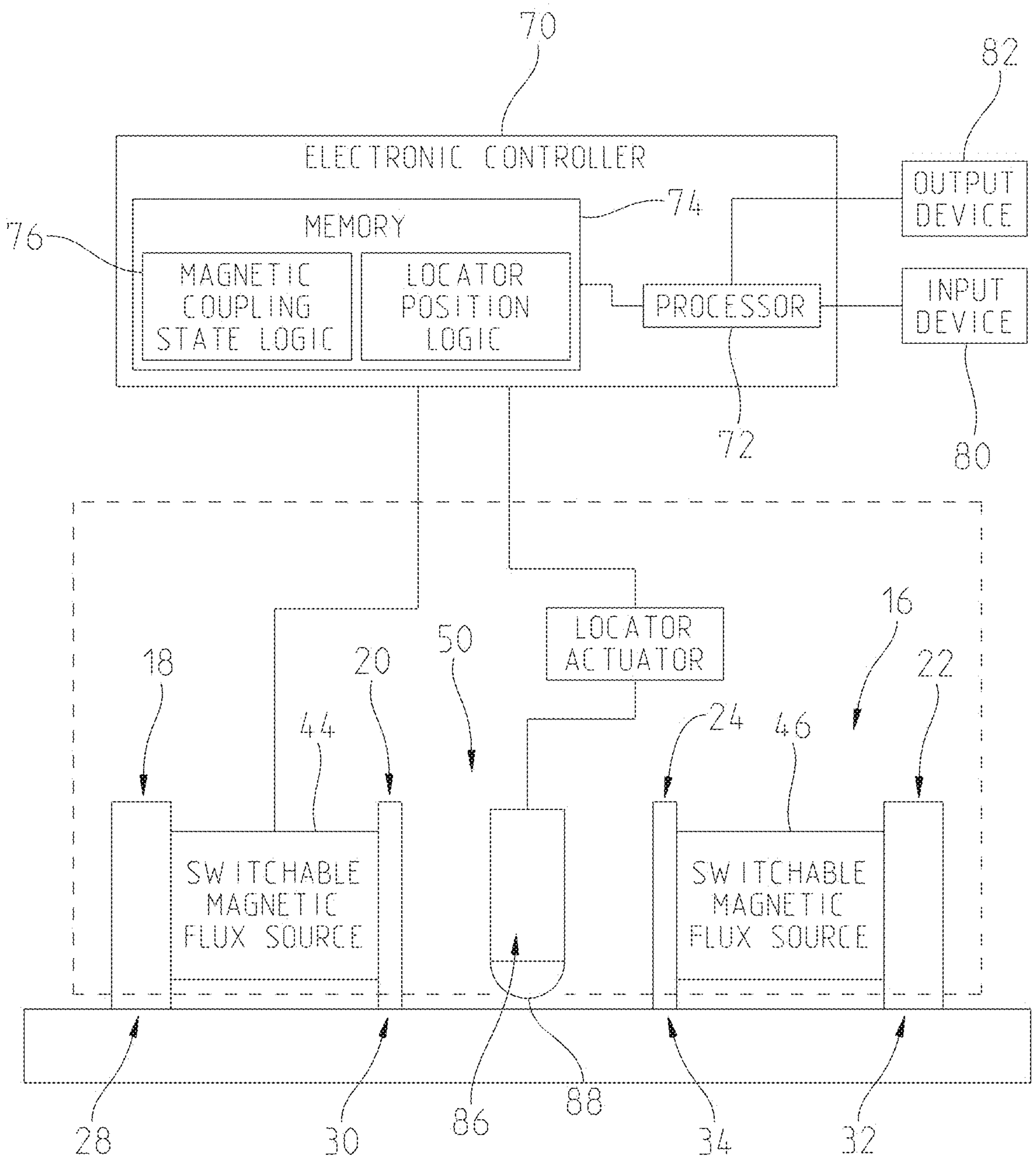
FIG. 22 illustrates the magnetic coupling device of FIG. 1 having a retractable locator positioned in a channel of the magnetic coupling device.

The position of retractable locator 86 in FIG. 22 is controlled by a locator actuator 90 which is supported by housing 14. Locator actuator 90 may be mechanical, electric, pneumatic, hydraulic, or magnetic and is capable of moving the lowermost extent 88 of at least one locator 86 between an extended position, such as in FIG. 21, and a retracted position, such as FIG. 22. In the illustrated embodiment, electronic controller 70 includes locator position logic 92 which is executed by at least one processor 72 to control the position of at least one locator 86. An advantage, among others, of incorporating a retractable locator is that magnetic coupling tool 10 may be used in a larger variety of applications and with different types of ferromagnetic workpiece 12.

Figure 23:
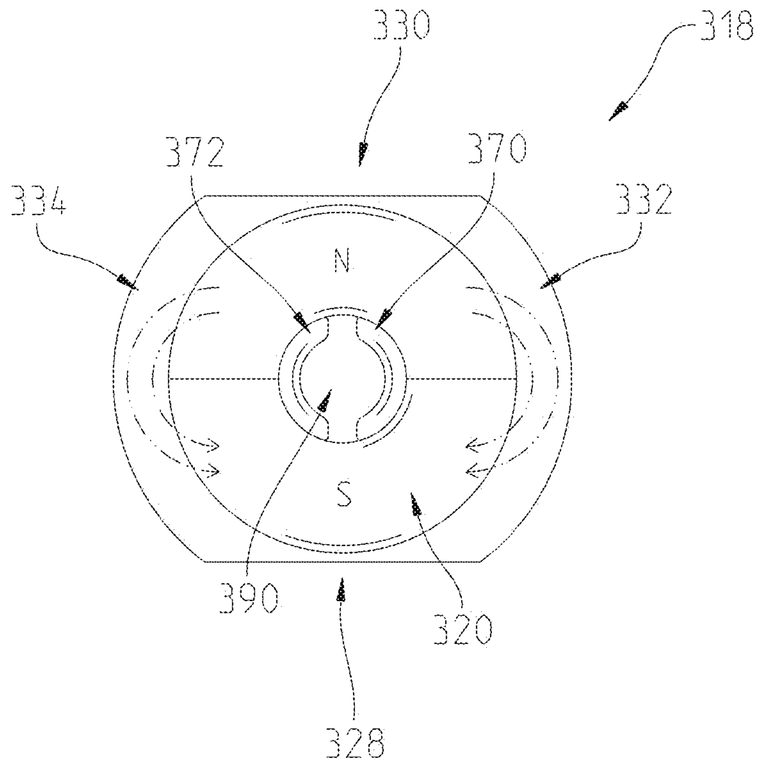
FIG. 23 illustrates another exemplary magnetic coupling device in a first configuration.
Figure 24:
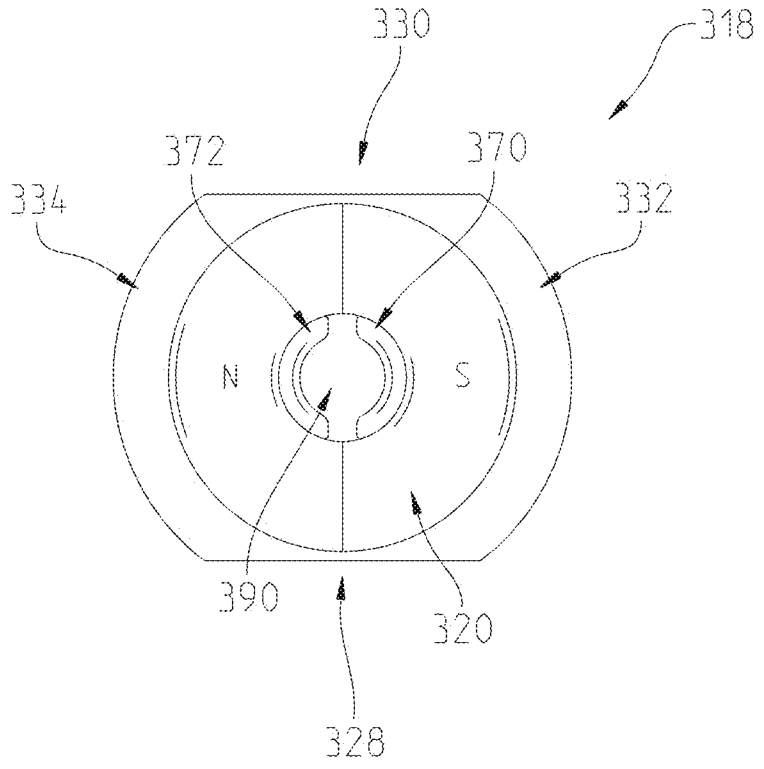
FIG. 24 illustrates the magnetic coupling device of FIG. 23 in a second configuration.

Referring to FIGS. 23 and 24, another arrangement of magnetic coupling device 300 is shown. In this arrangement, only permanent magnet 320 is included and permanent magnet 320 is rotatable relative to housing 318. Permanent magnet 320 forms the switchable magnetic flux source. In alternative embodiments, both first permanent magnet 320 and second permanent magnet 322 are included and rotate relative to housing 318 as a group to form the switchable magnetic flux source. In other embodiments, additional permanent magnets may be included in the group including first permanent magnet 320 and second permanent magnet 322 and rotate as a group to form the switchable magnetic flux source.

Referring to FIG. 23, first permanent magnet 320 is arranged relative to housing 318 such that each of the north pole portion (N) and the south pole portion (S) of first permanent magnet 320 are exposed to both first thick walled housing portion 332 and second thick walled housing portion 334. This is the OFF state for the device and the magnetic circuit is completed internally to housing 318. Referring to FIG. 24, first permanent magnet 320 has been rotated 90 degrees relative to FIG. 23 such that the north pole portion (N) of first permanent magnet 320 is exposed to second thick walled housing portion 334 and the south pole portion (S) of first permanent magnet 320 is exposed to first thick walled housing portion 332. This results in the magnetic circuit being completed through workpiece engagement surface 344 of second thick walled housing portion 334, workpiece engagement surface 376 of second pole member 372, ferromagnetic workpiece 12, workpiece engagement surface 342 of first thick walled housing portion 332, workpiece engagement surface 374 of first pole member 370, and is the ON state for the device.

In embodiments, the magnetic coupling devices disclosed herein have an elongated housing to hold multiple instances of the respective magnetic flux sources and pole portions in a linear array. An exemplary device having multiple instances of magnetic flux sources is the LAY Series unit as manufactured and sold by Magswitch Technology Inc.

In embodiments, the magnetic coupling devices disclosed herein have an elongated housing to hold multiple instances of the respective magnetic flux sources and pole portions in a circular array. An exemplary device having multiple instances of magnetic flux source 15 is the AY Series unit as manufactured and sold by Magswitch Technology Inc.

In embodiments, the magnetic coupling devices disclosed herein may be used as part of a fixture to hold a ferromagnetic part or an end-of-arm-tool for a robot which is able to couple and move a ferromagnetic part.

EXAMPLES

Example 1. A magnetic coupling device for magnetically coupling to a ferromagnetic workpiece is provided. The magnetic coupling device may comprise a housing; a switchable magnetic flux source supported by the housing; and a plurality of pole portions, each having at least one workpiece engagement surface. The switchable magnetic flux source may be switchable between at least an OFF state and an ON state. The switchable magnetic flux source may be positioned between the plurality of pole portions. The plurality of pole portions may include a first north pole portion having a first workpiece engagement surface, a second north pole portion having a second workpiece engagement surface, a first south pole portion having a third workpiece engagement surface, and a second south pole portion having a fourth workpiece engagement surface. The second north pole portion and the second south pole portion may each be positioned between the first north pole portion and the first south pole portion and the switchable magnetic flux source in an ON state may be magnetically coupled to each of the first workpiece engagement surface of the first north pole portion, the second workpiece engagement surface of the second north pole portion, the third workpiece engagement surface of the first south pole portion, and the fourth workpiece engagement surface of the second south pole portion.

Example 2. The magnetic coupling device of Example 1, wherein a channel may be located between the first north pole portion and the first south pole portion.

Example 3. The magnetic coupling device of Example 2, further comprising a sensor positioned in the channel.

Example 4. The magnetic coupling device of Example 2, further comprising a tool positioned in the channel.

Example 5. The magnetic coupling device of Example 2, further comprising one of a tool and a sensor positioned in the channel.

Example 6. The magnetic coupling device of any of Examples 2-5, wherein the channel may extend from a first position above a top side of the switchable magnetic flux source to a second position below the top side of the switchable magnetic flux source.

Example 7. The magnetic coupling device of any of Examples 2-6, wherein the channel may be positioned between the second north pole portion and the second south pole portion.

Example 8. The magnetic coupling device of any of the preceding Examples, wherein the second north pole portion may be positioned between the second south pole portion and the first north pole portion.

Example 9. The magnetic coupling device of any of the preceding Examples, wherein the switchable magnetic flux source includes a plurality of permanent magnets.

Example 10. The magnetic coupling device of Example 9, wherein at least first one of the plurality of permanent magnets may be an electro-permanent magnet.

Example 11. The magnetic coupling device of Example 9, wherein at least a second one of the plurality of permanent magnets may be a rare earth magnet.

Example 12. The magnetic coupling device of Example 9, wherein the plurality of permanent magnets including a first permanent magnet and a second permanent magnet movable relative to the first permanent magnet.

Example 13. The magnetic coupling device of Example 12, wherein the second permanent magnet may be rotatable relative to the first permanent magnet.

Example 14. The magnetic coupling device of Example 13, wherein each of the first permanent magnet and the second permanent magnet are positioned between the first north pole portion and the first south pole portion.

Example 15. The magnetic coupling device of any one of Examples 12-14, wherein in the ON state of the magnetic flux source a north pole of the second permanent magnet may be generally aligned with a north pole of the first permanent magnet and in the OFF state of the magnetic flux source a south pole of the second permanent magnet may be generally aligned with the north pole of the first permanent magnet.

Example 16. A magnetic coupling device for magnetically coupling to a ferromagnetic workpiece is provided. The magnetic coupling device may comprise a housing; a switchable magnetic flux source supported by the housing including a plurality of permanent magnets; and a plurality of workpiece engagement surfaces supported by the housing and magnetically coupled to the switchable magnetic flux source. The plurality of permanent magnets may include a first permanent magnet and a second permanent magnet movable relative to the first permanent magnet about a first axis of rotation. The plurality of workpiece engagement surfaces may be adapted to contact the ferromagnetic workpiece. A first workpiece engagement surface of the plurality of workpiece engagement surfaces may correspond to a north pole of the magnetic coupling device and a second workpiece engagement surface of the plurality of workpiece engagement surfaces may correspond to a south pole of the magnetic coupling device. Both the first workpiece engagement surface and the second workpiece engagement surface may be closer to the first axis of rotation than the second permanent magnet.

Example 17. The magnetic coupling device of Example 16, wherein the plurality of workpiece engagement surfaces may further include a third workpiece engagement surface corresponding to the north pole of the magnetic coupling device and a fourth workpiece engagement surface corresponding to the south pole of the magnetic coupling device, each of the third workpiece engagement surface and the fourth workpiece engagement surface may be further away from the first axis of rotation than the second permanent magnet.

Example 18. The magnetic coupling device of Example 16, wherein the first permanent magnet may surround the first workpiece engagement surface and the second workpiece engagement surface.

Example 19. The magnetic coupling device of Example 16, wherein each of the first permanent magnet and the second permanent magnet may surround the first workpiece engagement surface and the second workpiece engagement surface.

Example 20. The magnetic coupling device of any of the preceding Examples, further comprising: a first pole member including the first workpiece engagement surface; a second pole member including the second workpiece engagement surface, the first pole member and the second pole member defining a channel; and at least one sensor positioned in the channel.

Example 21. The magnetic coupling device of Example 20, wherein the second permanent magnet includes a top face and a bottom face, the bottom face facing the first permanent magnet, the at least one sensor may be positioned lower than the top face of the second permanent magnet.

Example 22. The magnetic coupling device of Example 21, wherein the at least one sensor may be positioned lower than the bottom face of the second permanent magnet.

Example 23. The magnetic coupling device of any one of Examples 20-22, wherein the at least one sensor includes a first magnetic field sensor positioned to monitor a first magnetic flux associated with at least one of the first workpiece engagement surface and the second workpiece engagement surface.

Example 24. The magnetic coupling device of any one of Examples 20-23, further comprising a logic control circuit operatively coupled to the at least one sensor, the logic control circuit may be configured to determine at least one operating state of the magnetic coupling device based on an output from the at least one sensor.

Example 25. The magnetic coupling device of Example 24 further comprising an output device which provides an indication of the operating state of the magnetic coupling device.

Example 26. The magnetic coupling device of any of Examples 20-25, further comprising at least one of a stationary pin, a retractable pin, and a probe moveable within the channel.

Example 27. The magnetic coupling device of Example 26, wherein the probe supports the at least one sensor.

Example 28. The magnetic coupling device of any of the preceding Examples further comprising an actuator operatively coupled to the second permanent magnet to move the second permanent magnet relative to the first permanent magnet.

Example 29. The magnetic coupling device of Example 28, wherein the actuator may be one of a user input having an operator actuatable portion, an electric motor, at least one conductive coil, a hydraulic system, and a pneumatic system.

Example 30. The magnetic coupling device of Example 28, wherein the actuator may be a user input having an operator actuatable portion which may be moveable between a first position corresponding to the second permanent magnet may be in a first orientation relative to the first permanent magnet and a second position corresponding to the second permanent magnet may be in a second orientation relative to the first permanent magnet and further comprising a lock to hold the second permanent magnet in at least one of the first orientation and the second orientation.

Example 31. A magnetic coupling device for magnetically coupling to a ferromagnetic workpiece is provided. The magnetic coupling device may comprise a housing; a switchable magnetic flux source supported by the housing including a plurality of permanent magnets; and a plurality of workpiece engagement surfaces supported by the housing and magnetically coupled to the switchable magnetic flux source. The plurality of permanent magnets may include a first permanent magnet and a second permanent magnet movable relative to the first permanent magnet about a first axis of rotation. The plurality of workpiece engagement surfaces may be adapted to contact the ferromagnetic workpiece. A first workpiece engagement surface of the plurality of workpiece engagement surfaces may correspond to a north pole of the magnetic coupling device and a second workpiece engagement surface of the plurality of workpiece engagement surfaces may correspond to a south pole of the magnetic coupling device. The magnetic coupling device may further comprise at least one sensor positioned in a channel between the first workpiece engagement surface and the second workpiece engagement surface. The at least one sensor may further be positioned between a lower surface of the first permanent magnet and the upper surface of the second permanent magnet.

Example 32. A magnetic coupling device for magnetically coupling to a ferromagnetic workpiece is provided. The magnetic coupling device may comprise a housing; a switchable magnetic flux source supported by the housing including a plurality of permanent magnets; and a plurality of workpiece engagement surfaces supported by the housing and magnetically coupled to the switchable magnetic flux source. The plurality of permanent magnets may include a first permanent magnet and a second permanent magnet movable relative to the first permanent magnet about a first axis of rotation. The plurality of workpiece engagement surfaces may be adapted to contact the ferromagnetic workpiece. A first workpiece engagement surface of the plurality of workpiece engagement surfaces may correspond to a north pole of the magnetic coupling device and a second workpiece engagement surface of the plurality of workpiece engagement surfaces may correspond to a south pole of the magnetic coupling device. The magnetic coupling device may further comprise at least one tool positioned in a channel between the first workpiece engagement surface and the second workpiece engagement surface and between a lower surface of the first permanent magnet and the upper surface of the second permanent magnet.

Example 33. A magnetic coupling device for magnetically coupling to a ferromagnetic workpiece is provided. The magnetic coupling device may comprise a housing; a switchable magnetic flux source supported by the housing including a plurality of permanent magnets; and a plurality of workpiece engagement surfaces supported by the housing and magnetically coupled to the switchable magnetic flux source. The plurality of permanent magnets may include a first permanent magnet and a second permanent magnet movable relative to the first permanent magnet. The first permanent magnet may have a first end surface and a second end surface. The plurality of workpiece engagement surfaces may be adapted to contact the ferromagnetic workpiece. The plurality of workpiece engagement surfaces may comprise a first workpiece engagement surface positioned adjacent the first end surface of the first permanent magnet, a second workpiece engagement surface positioned adjacent the second end surface of the first permanent magnet, each of the first workpiece engagement surface and the second workpiece engagement surface corresponding to a north pole of the magnetic coupling device; a third workpiece engagement surface; and a fourth workpiece engagement surface spaced apart from the third workpiece engagement surface, each of the third workpiece engagement surface and the fourth workpiece engagement surface corresponding to a south pole of the magnetic coupling device.

Example 34. The magnetic coupling device of Example 33, wherein the third workpiece engagement surface may be positioned adjacent the first end surface of the first permanent magnet and the fourth workpiece engagement surface may be positioned adjacent the second end surface of the first permanent magnet.

Example 35. The magnetic coupling device of Example 33, wherein the second permanent magnet may be rotatable relative to the first permanent magnet.

Example 36. The magnetic coupling device of Example 35, wherein a strength level of a magnetic field of the north pole of the magnetic coupling device may be varied based on a rotational position of the second permanent magnet relative to the first permanent magnet.

Example 37. The magnetic coupling device of Example 36, wherein the strength level of the magnetic field of the north pole of the magnetic coupling device may be strongest when a north pole of the second permanent magnet is aligned with a north pole of the first permanent magnet and may be weakest when the north pole of the second permanent magnet is aligned with a south pole of the first permanent magnet.

Example 38. The magnetic coupling device of Example 33, wherein the first permanent magnet surrounds the first workpiece engagement surface and the third workpiece engagement surface.

Example 39. The magnetic coupling device of Example 33, wherein each of the first permanent magnet and the second permanent magnet may surround the first workpiece engagement surface and the third workpiece engagement surface.

Example 40. The magnetic coupling device of any of Examples 33-39, may further comprise a first pole member including the first workpiece engagement surface; a second pole member including the third workpiece engagement surface, the first pole member and the second pole member defining a channel; and at least one sensor positioned in the channel.

Example 41. The magnetic coupling device of Example 40, wherein the second permanent magnet includes a top face and a bottom face, the bottom face facing the first permanent magnet, the at least one sensor may be positioned lower than the top face of the second permanent magnet.

Example 42. The magnetic coupling device of Example 41, wherein the at least one sensor may be positioned lower than the bottom face of the second permanent magnet.

Example 43. The magnetic coupling device of any one of Examples 40-42, wherein the at least one sensor includes a first magnetic field sensor positioned to monitor a first magnetic flux associated with at least one of the first workpiece engagement surface and the third workpiece engagement surface.

Example 44. The magnetic coupling device of any one of Examples 40-42, further comprising a logic control circuit operatively coupled to the at least one sensor, the logic control circuit may be configured to determine at least one operating state of the magnetic coupling device based on an output from the at least one sensor.

Example 45. The magnetic coupling device of Example 44 further comprising an output device which may provide an indication of the operating state of the magnetic coupling device.

Example 46. The magnetic coupling device of any of Examples 40-45, further comprising a probe moveable within the channel.

Example 47. The magnetic coupling device of Example 46, wherein the probe supports the at least one sensor.

Example 48. The magnetic coupling device of any of Examples 33-47, further comprising an actuator operatively coupled to the second permanent magnet to move the second permanent magnet relative to the first permanent magnet.

Example 49. The magnetic coupling device of Example 48, wherein the actuator may be one of a user input having an operator actuatable portion, an electric motor, at least one conductive coil, a hydraulic system, and a pneumatic system.

Example 50. The magnetic coupling device of any one of Examples 32, 33, and 40, wherein a proximity sensor may be positioned in the channel.

Example 51. A magnetic coupling device for magnetically coupling to a ferromagnetic workpiece is provided. The magnetic coupling device may comprise a housing; a switchable magnetic flux source supported by the housing including at least one electro-permanent magnet; and a plurality of workpiece engagement surfaces supported by the housing and magnetically coupled to the switchable magnetic flux source. The plurality of workpiece engagement surfaces may be adapted to contact the ferromagnetic workpiece. A first pole portion may include a first workpiece engagement surface of the plurality of workpiece engagement surfaces. A second pole portion may include a second workpiece engagement surface of the plurality of workpiece engagement surfaces. The first workpiece engagement surface and the second workpiece engagement surface may correspond to a north pole of the magnetic coupling device. A third pole portion may include a third workpiece engagement surface of the plurality of workpiece engagement surfaces. A fourth pole portion may include a fourth workpiece engagement surface of the plurality of workpiece engagement surfaces. The third workpiece engagement surface and the fourth workpiece engagement surface may correspond to a south pole of the magnetic coupling device. Both the first pole portion and the third pole portion may be received in an opening in the switchable magnetic flux source.

Example 52. The magnetic coupling device of Example 51, wherein the second pole portion and the fourth pole portion are outside of an envelope of the switchable magnetic flux source.

Example 53. The magnetic coupling device of Example 51, wherein the switchable magnetic flux source includes at least one rare earth permanent magnet.

Example 54. The magnetic coupling device of any of Examples 51-53, further comprising at least one sensor, wherein the first pole member and the second pole member define a channel, the at least one sensor positioned in the channel.

Example 55. A magnetic coupling device for magnetically coupling to a ferromagnetic workpiece is provided. The magnetic coupling device may comprise a housing; a switchable magnetic flux source supported by the housing including a plurality of magnets. The plurality of magnets may include a first magnet and a second magnet. The switchable magnetic flux may have a first configuration wherein a north pole of the second magnet may be aligned relative to a north pole of the first magnet and a second configuration wherein a south pole of the second magnet may be aligned relative to the north pole of the first magnet. The magnetic coupling device may further comprise a plurality of workpiece engagement surfaces supported by the housing and magnetically coupled to the switchable magnetic flux source. The plurality of workpiece engagement surfaces may be adapted to contact the ferromagnetic workpiece. A first pole portion may include a first workpiece engagement surface of the plurality of workpiece engagement surfaces. A second pole portion may include a second workpiece engagement surface of the plurality of workpiece engagement surfaces. The first workpiece engagement surface and the second workpiece engagement surface may correspond to a north pole of the magnetic coupling device. A third pole portion may include a third workpiece engagement surface of the plurality of workpiece engagement surfaces. A fourth pole portion may include a fourth workpiece engagement surface of the plurality of workpiece engagement surfaces. The third workpiece engagement surface and the fourth workpiece engagement surface may correspond to a south pole of the magnetic coupling device. Both the first pole portion and the third pole portion may be received in an opening in the switchable magnetic flux source.

Example 56. The magnetic coupling device of Example 55, wherein the second pole portion and the fourth pole portion are outside of an envelope of the first magnet.

Example 57. The magnetic coupling device of Example 55, wherein the second magnet may be movable relative to the first permanent magnet.

Example 58. The magnetic coupling device of Example 57, wherein the second magnet may be rotatable relative to the first magnet.

Example 59. The magnetic coupling device of Example 58, wherein a strength level of a magnetic field of the north pole of the magnetic coupling device may be varied based on a rotational position of the second magnet relative to the first magnet.

Example 60. The magnetic coupling device of Example 59, wherein the strength level of the magnetic field of the north pole of the magnetic coupling device may be strongest when a north pole of the second magnet is aligned with a north pole of the first magnet and may be weakest when the north pole of the second magnet is aligned with a south pole of the first magnet.

Example 61. The magnetic coupling device of any of Examples 55-60, further comprising at least one sensor, wherein the first pole member and the second pole member may define a channel, the at least one sensor may be positioned in the channel.

Example 62. The magnetic coupling device of Example 61, wherein the second magnet includes a top face and a bottom face, the bottom face facing the first magnet, the at least one sensor may be positioned lower than the top face of the second magnet.

Example 63. The magnetic coupling device of Example 62, wherein the at least one sensor may be positioned lower than the bottom face of the second magnet.

Example 64. The magnetic coupling device of any one of Examples 61-63, wherein the at least one sensor includes a first magnetic field sensor positioned to monitor a first magnetic flux associated with at least one of the first workpiece engagement surface and the third workpiece engagement surface.

Example 65. The magnetic coupling device of any one of Examples 61-64, further comprising a logic control circuit operatively coupled to the at least one sensor, the logic control circuit may be configured to determine at least one operating state of the magnetic coupling device based on an output from the at least one sensor.

Example 66. The magnetic coupling device of Example 65 further comprising an output device which provides an indication of the operating state of the magnetic coupling device.

Example 67. The magnetic coupling device of any of Examples 61-66, further comprising at least one of a pin, a probe, and tool positioned within the channel.

Example 68. The magnetic coupling device of Example 67, wherein the probe supports the at least one sensor.

Example 69. The magnetic coupling device of Example 57, further comprising an actuator operatively coupled to the second magnet to move the second magnet relative to the first magnet.

Example 70. The magnetic coupling device of Example 69, wherein the actuator may be one of a user input having an operator actuatable portion, an electric motor, at least one conductive coil, a hydraulic system, and a pneumatic system.

Example 71. The magnetic coupling device of any one of Examples 55-70, wherein the first magnet may be a permanent magnet.

Example 72. The magnetic coupling device of any one of Examples 55-71, wherein each of the first magnet and the second magnet may be a permanent magnet.

Example 73. A magnetic coupling device for magnetically coupling to a ferromagnetic workpiece is provided. The magnetic coupling device may comprise a housing and a switchable magnetic flux source supported by the housing including a plurality of magnets and a plurality of ferromagnetic inserts. The plurality of magnets may include a first permanent ring magnet having a first outer circumferential surface and a first inner circumferential surface and a second permanent ring magnet having a second outer circumferential surface and a second inner circumferential surface. The plurality of ferromagnetic inserts may include a first ferromagnetic insert having a first outer arcuate surface positioned adjacent the first inner circumferential surface of the first permanent ring magnet and a second ferromagnetic insert having a second outer arcuate surface positioned adjacent the second inner circumferential surface of the second permanent magnet. The switchable magnetic flux may have a first configuration wherein a north pole of the second permanent ring magnet may be aligned relative to a north pole of the first permanent ring magnet and a second configuration wherein a south pole of the second permanent ring magnet may be aligned relative to the north pole of the first permanent magnet. The magnetic coupling device may further comprise a plurality of workpiece engagement surfaces magnetically coupled to the switchable magnetic flux source. The plurality of workpiece engagement surfaces may be adapted to contact the ferromagnetic workpiece. A first pole portion may include a first workpiece engagement surface of the plurality of workpiece engagement surfaces. A second pole portion may include a second workpiece engagement surface of the plurality of workpiece engagement surfaces.

Example 74. The magnetic coupling device of Example 73, wherein the second permanent ring magnet may be moveable relative to the first permanent ring magnet.

Example 75. The magnetic coupling device of Example 74, wherein the second permanent ring magnet may be rotatable relative to the first permanent ring magnet about a first axis.

Example 76. The magnetic coupling device of Example 75, wherein the first ferromagnetic insert remains stationary relative to the first permanent ring magnet as the second permanent ring magnet rotates relative to the first permanent ring magnet.

Example 77. The magnetic coupling device of Example 75, wherein the second ferromagnetic insert remains stationary relative to the first permanent ring magnet as the second permanent ring magnet rotates relative to the first permanent ring magnet.

Example 78. The magnetic coupling device of any of Examples 73-77, wherein each of the first outer arcuate surface of the first ferromagnetic insert and the second outer arcuate surface of the second ferromagnetic insert are positioned closer to the first axis than the first permanent ring magnet and the second permanent ring magnet.

Example 79. The magnetic coupling device of any of Examples 73-77, wherein the first outer arcuate surface of the first ferromagnetic insert contacts the first inner circumferential surface of the first permanent ring magnet.

Example 80. The magnetic coupling device of any of Examples 73-77, wherein the first outer arcuate surface of the first ferromagnetic insert contacts the second inner circumferential surface of the second permanent ring magnet.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A magnetic coupling device for magnetically coupling to a ferromagnetic workpiece, comprising:

a housing;

a switchable magnetic flux source supported by the housing including at least one electro-permanent magnet; and a plurality of workpiece engagement surfaces supported by the housing and magnetically coupled to the switchable magnetic flux source, the plurality of workpiece engagement surfaces adapted to contact the ferromagnetic workpiece, a first pole portion including a first workpiece engagement surface of the plurality of workpiece engagement surfaces, a second pole portion including a second workpiece engagement surface of the plurality of workpiece engagement surfaces, the first workpiece engagement surface and the second workpiece engagement surface corresponding to a north pole of the magnetic coupling device, a third pole portion including a third workpiece engagement surface of the plurality of workpiece engagement surfaces, a fourth pole portion including a fourth workpiece engagement surface of the plurality of workpiece engagement surfaces, the third workpiece engagement surface and the fourth workpiece engagement surface corresponding to a south pole of the magnetic coupling device, both the first pole portion and the third pole portion being received in an opening in the switchable magnetic flux source.

2. The magnetic coupling device of claim 1, wherein the second pole portion and the fourth pole portion are outside of an envelope of the switchable magnetic flux source.

3. The magnetic coupling device of claim 1, wherein the switchable magnetic flux source includes at least one rare earth permanent magnet.

4. The magnetic coupling device of claim 1, further comprising at least one sensor, wherein the first pole member and the second pole member define a channel, the at least one sensor positioned in the channel.

* * * * *